(12) United States Patent
Kuroki et al.

(10) Patent No.: US 8,276,572 B2
(45) Date of Patent: Oct. 2, 2012

(54) WORKING GAS CIRCULATION ENGINE

(75) Inventors: Rentaro Kuroki, Susono (JP); Daisaku Sawada, Gotemba (JP); Akira Kato, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 469 days.

(21) Appl. No.: 12/675,645

(22) PCT Filed: Mar. 10, 2009

(86) PCT No.: PCT/JP2009/054576
§ 371 (c)(1),
(2), (4) Date: Feb. 26, 2010

(87) PCT Pub. No.: WO2010/103621
PCT Pub. Date: Sep. 16, 2010

(65) Prior Publication Data
US 2011/0056466 A1 Mar. 10, 2011

(51) Int. Cl.
*F02B 43/00* (2006.01)
*F02B 47/08* (2006.01)
(52) U.S. Cl. .................. 123/568.12; 123/1 A
(58) Field of Classification Search ............ 123/568.11, 123/568.12, 568.13, 568.14, 568.15, 568.21, 123/1 A; 701/101, 102, 103, 108; 60/274, 60/276, 278, 279, 286, 320
See application file for complete search history.

(56) References Cited

U.S. PATENT DOCUMENTS
7,661,416 B2 * 2/2010 Sasajima et al. ......... 123/568.12

FOREIGN PATENT DOCUMENTS
| JP | 11-93681 | 4/1999 |
| JP | 2006-077638 A | 3/2006 |
| JP | 2006-77639 A | 3/2006 |
| JP | 2007-77834 A | 3/2007 |
| JP | 2007-247524 A | 9/2007 |
| JP | 2008-64018 A | 3/2008 |

OTHER PUBLICATIONS

Decision of Grant mailed Jun. 28, 2011 in JP 2010-500988 and translation thereof.

* cited by examiner

*Primary Examiner* — Mahmoud Gimie
(74) *Attorney, Agent, or Firm* — Kenyon & Kenyon LLP

(57) ABSTRACT

A combustion chamber to which a reactant and a working gas whose specific heat ratio is higher than that of air are supplied and in which the working gas can expand following a reaction of the reactant, a circulation path capable of resupplying the working gas into the combustion chamber by causing the working gas to circulate from an exhaust side to a suction side of the combustion chamber, supplying means that supplies the reactant, a concentration detection means capable of detecting a concentration of the reactant in the circulation path, and a supply control means that sets at least a first supply rate of the reactant by the supplying means in a time for starting based on the concentration of the reactant detected by the concentration detection means before a start of supplying of the reactant by the supplying means are included and so proper starting can be assured.

8 Claims, 13 Drawing Sheets

WORKING GAS CIRCULATION ENGINE

This is a 371 national phase application of PCT/JP2009/054576 filed 10 Mar. 2009, the entire content of which is incorporated herein by reference.

TECHNICAL FIELD

The present invention relates to a working gas circulation engine. More particularly, the present invention relates to a working gas circulation engine in which working gas contained in exhaust gas is allowed to circulate from an exhaust side to a suction side of a combustion chamber, and again can be supplied to the combustion chamber.

BACKGROUND ART

There has been known a working gas circulation engine that is so-called a closed-cycle engine as a conventional engine. In the working gas circulation engine, working gas contained in exhaust gas is allowed to circulate from an exhaust side to a suction side of a combustion chamber, and again can be supplied to the combustion chamber. The working gas circulation engine of this type includes a combustion chamber to which oxygen serving as an oxidizing agent and hydrogen serving as a fuel that is burned by the oxygen are supplied as a reacted product, and to which a working gas having a specific heat ratio higher than that of air is supplied, and a circulation path into which the working gas is circulated from an exhaust side to a suction side of the combustion chamber and again can be supplied to the combustion chamber. The working gas is caused to expand due to the combustion of the oxygen and hydrogen in the combustion chamber, whereby power is generated. Further, the working gas is circulated back to the combustion chamber through the circulation path without being released into the atmosphere.

As the conventional working gas circulation engine, a hydrogen engine disclosed in Patent Document 1 described below has been known, for example. In the hydrogen engine disclosed in the Patent Document 1, oxygen and hydrogen are supplied to the combustion chamber, and argon composed of a monoatomic molecule having a specific heat ratio higher than that of air is supplied into the combustion chamber as a working gas in order to enhance thermal efficiency. In the working gas circulation engine, argon is thermally expanded due to the combustion of hydrogen in the combustion chamber, which pushes down a piston to generate power.

Patent Document 1: Japanese Patent Application Laid-open No. 11-93681

DISCLOSURE OF INVENTION

Problem to be Solved by the Invention

Since a working gas is re-supplied into a combustion chamber via a circulation path by causing the working gas to circulate from the exhaust side to the suction side of the combustion chamber in the above hydrogen fueled engine described in Patent Document 1, proper starting qualities may not be obtained when the engine is started next time depending on, for example, the state inside the circulation path while the engine is stopped.

Thus, the present invention provides a working gas circulation engine capable of starting properly.

Means for Solving Problem

In order to achieve the object, a working gas circulation engine according to the present invention includes a combustion chamber into which a reactant and a working gas whose specific heat ratio is higher than that of air are supplied and in which the working gas can expand due to a reaction of the reactant; a circulation path that allows the working gas to circulate from an exhaust side to a suction side of the combustion chamber and that is capable of supplying the working gas again to the combustion chamber; a supplying means that supplies the reactant; a concentration detection means capable of detecting a concentration of the reactant in the circulation path; and a supply control means that sets at least a first supply rate of the reactant by the supplying means in a time for starting, based on the concentration of the reactant detected by the concentration detection means before a start of supplying of the reactant by the supplying means.

In the working gas circulation engine, it may be configured that the supplying means supplies oxygen as the reactant, the concentration detection means can detect the concentration of the oxygen, and the supply control means sets at least the first supply rate of the oxygen by the supplying means in the time for starting, based on the concentration of the oxygen detected by the concentration detection means before the start of supplying of the oxygen by the supplying means.

In the working gas circulation engine, it may be configured that the supplying means supplies hydrogen as the reactant, the concentration detection means can detect the concentration of the hydrogen, and the supply control means sets at least the first supply rate of the hydrogen by the supplying means in the time for starting, based on the concentration of the hydrogen detected by the concentration detection means before the start of supplying of the hydrogen by the supplying means.

In the working gas circulation engine, it may be configured that, when there are a plurality of the reactants, the supply control means sets at least the first supply rate of each of the reactants by the supplying means in the time for starting, based on the concentration of each of the reactants detected by the concentration detection means before the start of supplying of each of the reactants by the supplying means.

In the working gas circulation engine, it may be configured that the supplying means includes an oxygen supplying means that supplies oxygen as the reactant to the circulation path to supply the oxygen into the combustion chamber and a hydrogen supplying means that supplies hydrogen as the reactant subjected to combustion by the oxygen directly into the combustion chamber, and the supply control means sets the supply rate of the oxygen by the oxygen supplying means in an early period of the time for starting to a supply rate at which the oxygen remains in a gas after the combustion, based on the concentration of the oxygen detected by the concentration detection means before the start of supplying of the oxygen by the oxygen supplying means.

In the working gas circulation engine, it may be configured that the supplying means includes an oxygen supplying means that supplies oxygen as the reactant and a hydrogen supplying means that supplies hydrogen as the reactant subjected to combustion by the oxygen, and the supply control means sets the supply rate of the oxygen by the oxygen supplying means after the start of supplying of the oxygen in the time for starting, based on the concentration of the oxygen in a gas after the combustion detected by the concentration detection means after the start of supplying of the oxygen.

In the working gas circulation engine, it may be configured that the supplying means includes an oxygen supplying means that supplies oxygen as the reactant to the circulation path to supply the oxygen into the combustion chamber and a hydrogen supplying means that supplies hydrogen as the reactant subjected to combustion by the oxygen directly into the combustion chamber, and the supply control means limits supplying of at least the hydrogen by the hydrogen supplying means, when a supplying period of the oxygen by the oxygen supplying means in the time for starting is not secured for a predetermined period in which the oxygen supplied by the oxygen supplying means is sufficiently sucked into the combustion chamber, with respect to a valve open period of a suction valve that opens/closes a suction port constituting the circulation path.

In the working gas circulation engine, it may be configured that the supplying means includes an oxygen supplying means that supplies oxygen as the reactant and a hydrogen supplying means that supplies hydrogen as the reactant subjected to combustion by the oxygen, and the supply control means permits supplying of the hydrogen by the hydrogen supplying means, when the concentration detection means detects a predetermined amount of change in the concentration of the oxygen after the oxygen being supplied by the oxygen supplying means in the time for starting.

Effect of the Invention

The working gas circulation engine in accordance with the present invention can start properly.

Figure 1:
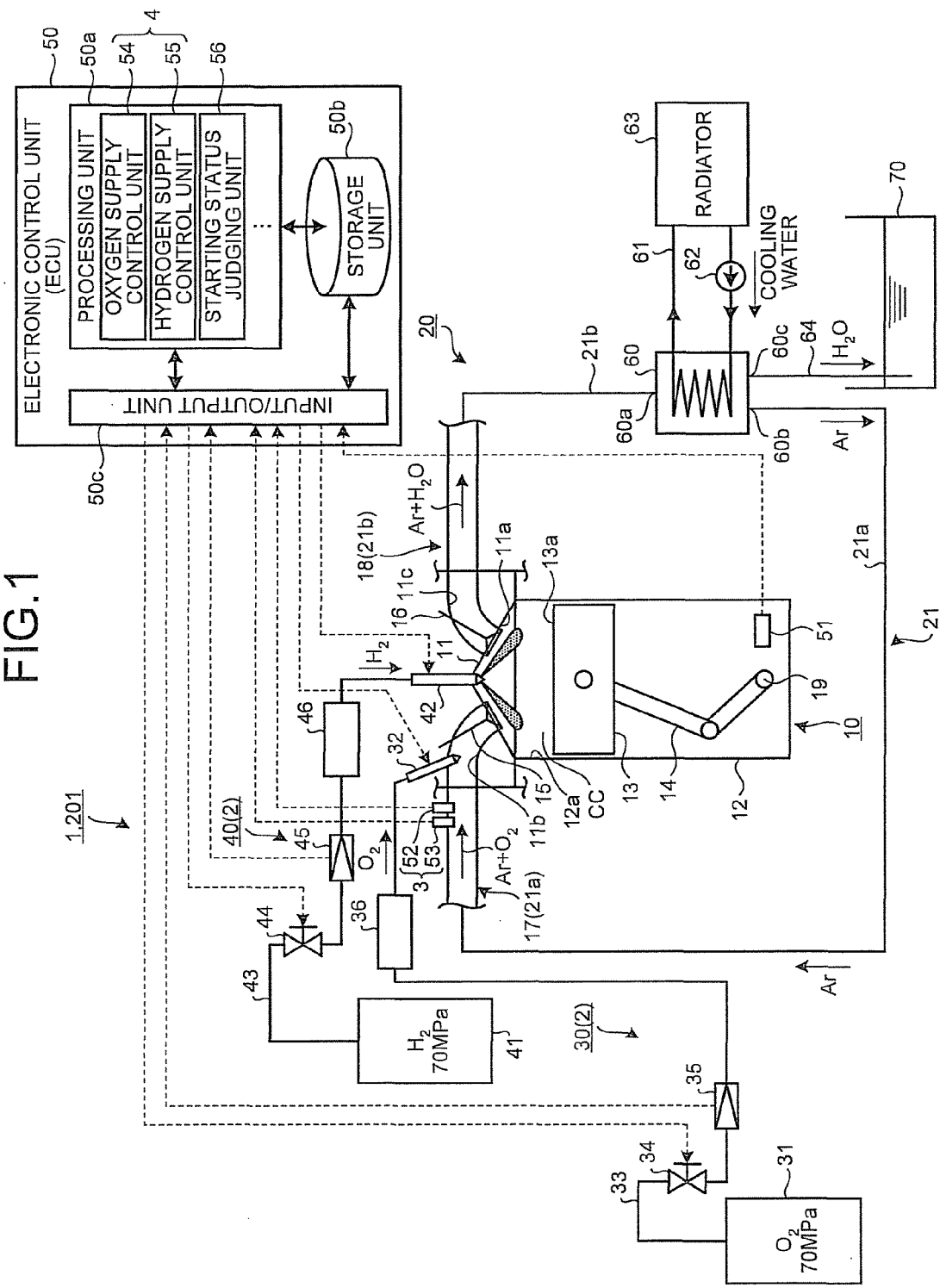
FIG. 1 is a schematic diagram of a working gas circulation engine according to a first embodiment of the present invention.

EXPLANATIONS OF LETTERS OR NUMERALS 1, 201, 301, 401, 501 working gas circulation engine
2 supplying apparatus (Supply means)
3 reactant concentration sensor (Concentration detection means)
4 supply control unit (Supply control means)
10 engine body
11b suction port
11c exhaust port
15 suction valve
16 exhaust valve
17 suction pipe
18 exhaust pipe
19 crankshaft
20 circulation path
21 circulating passage
30 oxidizing agent supplying apparatus (oxygen supplying means)
32 oxidizing agent injection means
40 fuel supplying apparatus (hydrogen supplying means)
42 fuel injection means
50 electronic control unit
51 crank angle sensor
52, 352 oxygen concentration sensor
53 hydrogen concentration sensor
54 oxygen supply control unit
55 hydrogen supply control unit
56 starting status judging unit
60 condenser
70 storage tank
457, 557 supply prohibiting/permitting unit
A starting basic oxygen supply rate
A' starting correction oxygen supply rate
A starting basic hydrogen supply rate
a' starting correction hydrogen supply rate
B starting increment
C starting final oxygen supply rate
C' correction starting final oxygen supply rate
CC combustion chamber

BEST MODES FOR CARRYING OUT THE INVENTION

Embodiments of the working gas circulation engine according to the present invention will be described below in detail based on drawings. However, the present invention should not be limited by these embodiments. Components in embodiments below contain those components easily replaceable by those skilled in the art or substantially identical thereto.

(First Embodiment)

Figure 2:
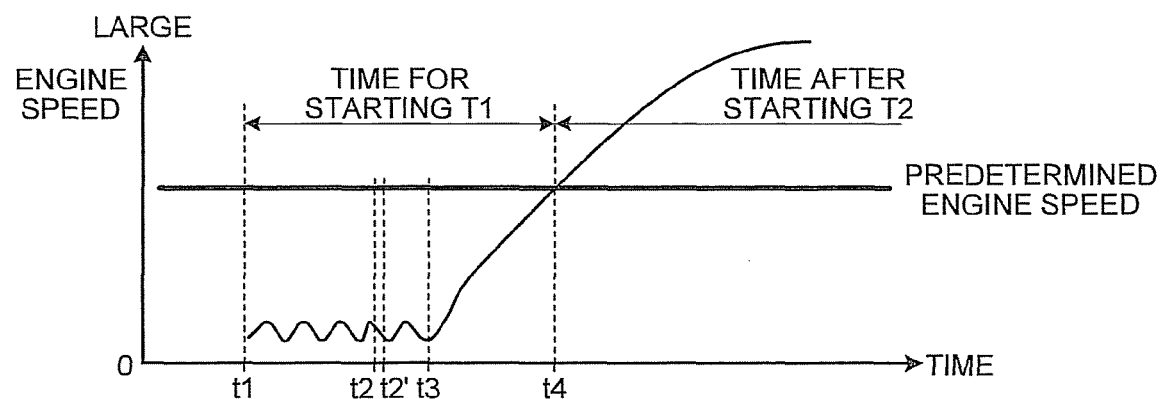
FIG. 2 is a time chart explaining time for starting the working gas circulation engine according to the first embodiment of the present invention.
Figure 3:
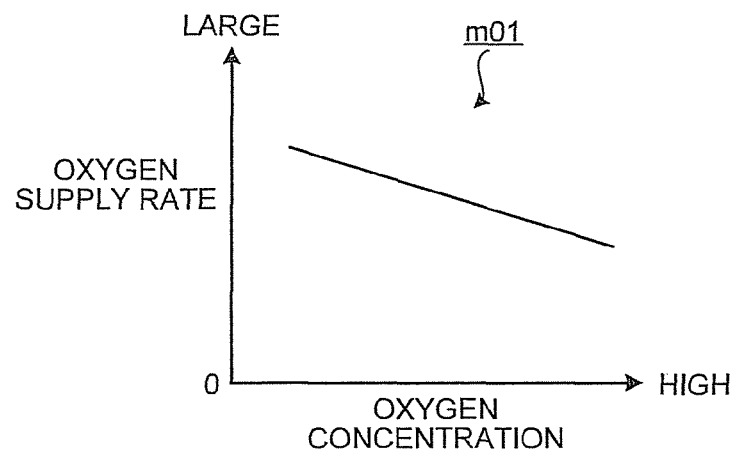
FIG. 3 is an oxygen supply rate map of the working gas circulation engine according to the first embodiment of the present invention.
Figure 4:
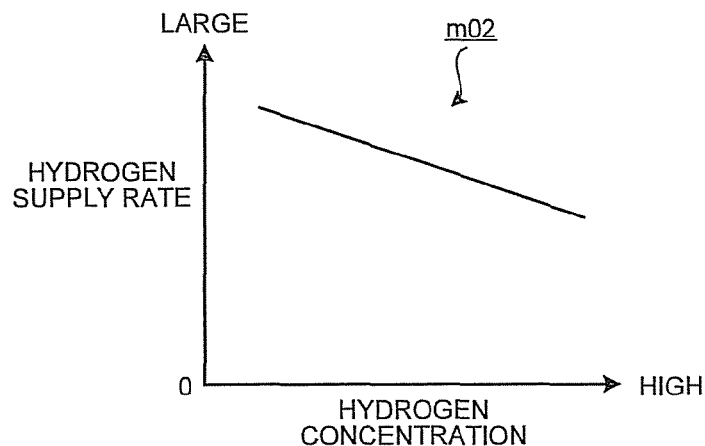
FIG. 4 is a hydrogen supply rate map of the working gas circulation engine according to the first embodiment of the present invention.
Figure 5:
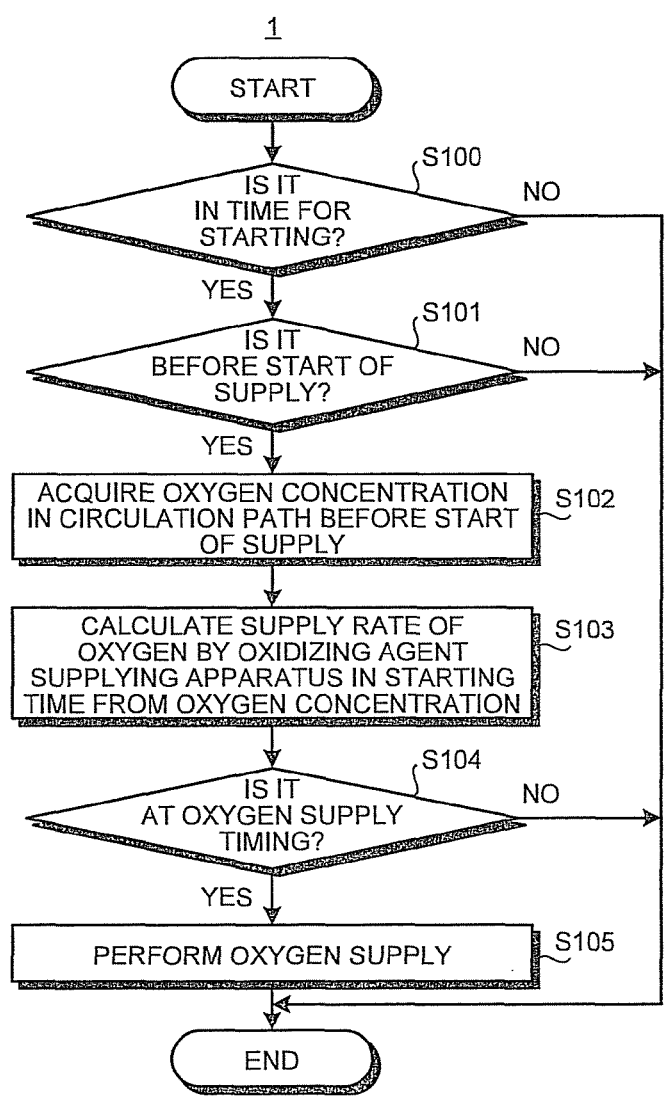
FIG. 5 is a flow chart explaining oxygen supplying control when the working gas circulation engine according to the first embodiment of the present invention is started.
Figure 6:
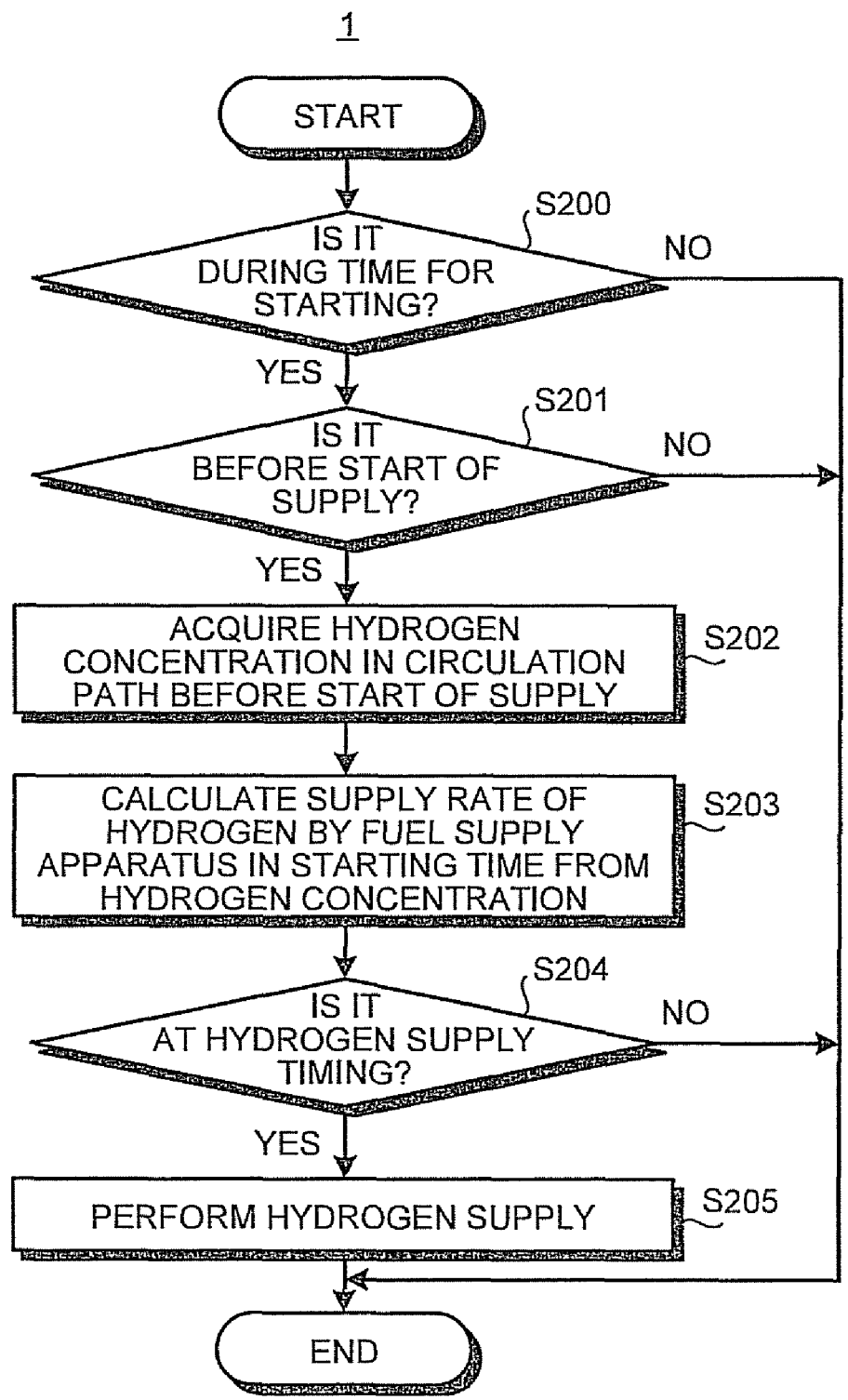
FIG. 6 is a flow chart explaining hydrogen supplying control when the working gas circulation engine according to the first embodiment of the present invention is started.

FIG. 1 is a schematic diagram of a working gas circulation engine according to a first embodiment of the present invention; FIG. 2 is a time chart explaining when the working gas circulation engine according to the first embodiment of the present invention is started; FIG. 3 is an oxygen supply rate map of the working gas circulation engine according to the first embodiment of the present invention; FIG. 4 is a hydrogen supply rate map of the working gas circulation engine according to the first embodiment of the present invention; FIG. 5 is a flow chart explaining oxygen supplying control when the working gas circulation engine according to the first embodiment of the present invention is started; and FIG. 6 is a flow chart explaining hydrogen supplying control when the working gas circulation engine according to the first embodiment of the present invention is started.

As illustrated in FIG. 1, a working gas circulation engine 1 in the present embodiment includes a combustion chamber CC to which a reactant and a working gas whose specific heat ratio is higher than that of air are supplied and in which the working gas can expand following a reaction of the reactant, a circulation path 20 capable of re-supplying the working gas into the combustion chamber CC by causing the working gas to circulate from the exhaust side to the suction side of the combustion chamber CC, and a supplying apparatus 2 as supplying means for supplying a reactant and is a so-called closed-cycle engine capable of re-supplying the working gas contained in an exhaust gas into the combustion chamber CC by causing the working gas to circulate from the exhaust side to the suction side of the combustion chamber CC. In the present embodiment, oxygen as an oxidizing agent and hydrogen as fuel subjected to combustion by the oxidizing agent are used as reactants and the supplying apparatus 2 in the present embodiment has an oxidizing agent supplying apparatus 30 as oxygen supplying means and a fuel supplying apparatus 40 as hydrogen supplying means. Thus, the working gas is expanded by reaction heat generated following a reaction of oxygen supplied from the oxidizing agent supplying apparatus 30 and hydrogen supplied from the fuel supplying apparatus 40 in the combustion chamber CC, that is, combustion heat generated by accompanying combustion (exothermic reaction) of hydrogen.

More specifically, the working gas circulation engine 1 includes, as illustrated in FIG. 1, the combustion chamber CC to which an oxidizing agent, fuel subjected to combustion by the oxidizing agent, and a working gas that generates power accompanying combustion of the fuel are supplied and the circulation path 20 that links the suction side and the exhaust side of the combustion chamber CC and is configured so that the working gas is re-supplied to the combustion chamber CC via the circulation path 20 without being released to atmospheric air. The working gas circulation engine 1 enhances thermal efficiency by subjecting fuel to combustion in the combustion chamber CC to cause the working gas to thermally expand accompanying the combustion of fuel, thereby generating power.

The working gas circulation engine 1 includes an engine body 10 in which the combustion chamber CC is formed, the circulation path 20 that links the suction side and the exhaust side of the combustion chamber CC, the oxidizing agent supplying apparatus 30 that supplies an oxidizing agent into the combustion chamber CC, the fuel supplying apparatus 40 that supplies fuel into the combustion chamber CC, an electronic control unit (ECU) 50 that controls each unit of the working gas circulation engine 1, a condenser 60, and a storage tank 70. Both the combustion chamber CC of the engine body 10 and the circulation path 20 are filled with a working gas and the working gas circulates between the combustion chamber CC and the circulation path 20. The engine body 10 exemplified in FIG. 1 has only one cylinder illustrated therein, but the working gas circulation engine 1 of the present invention is not limited to this and is applicable to the engine body 10 of a plurality of cylinders.

The combustion chamber CC in the present embodiment is formed in the engine body 10. The combustion chamber CC of the engine body 10 has an oxidizing agent, fuel that is subjected to combustion by the oxidizing agent to generate water vapor by the combustion here, and a working gas supplied thereto and the working gas can expand following combustion of the fuel and also the water vapor and working gas can be discharged as exhaust gases after the combustion of the fuel.

More specifically, the engine body 10 includes a cylinder head 11 forming the combustion chamber CC, a cylinder block 12, and a piston 13. The piston 13 is coupled to a crankshaft 19 via a connecting rod 14 and is reciprocally movably disposed inside a space divided by a recess 11a of the undersurface of the cylinder head 11 and a cylinder bore 12a of the cylinder block 12. The combustion chamber CC is constituted by a space enclosed by the wall surface of the recess 11a of the cylinder head 11, the wall surface of the cylinder bore 12a, and a top face 13a of the piston 13.

The engine body 10 has a suction port 11b and an exhaust port 11c formed in the cylinder head 11. Both the suction port 11b and the exhaust port 11c form a portion of the circulation path 20. One end of each of the suction port 11b and the exhaust port 11c has an opening inside the combustion chamber CC. The engine body 10 has a suction valve 15 disposed in an opening portion on the side of the combustion chamber CC of the suction port 11b. The suction valve 15 opens the opening on the side of the combustion chamber CC of the suction port 11b when the valve opens and closes the opening on the side of the combustion chamber CC of the suction port 11b when the valve closes. The engine body 10 has an exhaust valve 16 disposed in an opening portion on the side of the combustion chamber CC of the exhaust port 11c. The exhaust valve 16 opens the opening on the side of the combustion chamber CC of the exhaust port 11c when the valve opens and closes the opening on the side of the combustion chamber CC of the exhaust port 11c when the valve closes.

Some types of the suction valve 15 and the exhaust valve 16 are driven to open/close accompanying, for example, rotation of a cam shaft (not illustrated) and resiliency of an elastic member (helical spring). In such types of the suction valve 15 and the exhaust valve 16, the cam shaft thereof is caused to move together with rotation of the crankshaft 19 by placing a power transmission mechanism composed of a chain, sprocket and the like between the cam shaft and the crankshaft 19 to be driven to open/close at preset opening/closing times. The engine body 10 may include a variable valve mechanism such as a so-called variable valve timing & lift mechanism that can change the opening/closing times or lift amounts of the suction valve 15 and the exhaust valve 16, whereby the opening/closing times or lift amounts of the suction valve 15 and the exhaust valve 16 can be changed to those suitable for operating conditions. Further, the engine body 10 may apply a so-called electromagnetic drive valve that drives to open/close the suction valve 15 and the exhaust valve 16 by using an electromagnetic force in order to obtain an operation effect similar to that of such a variable valve mechanism.

The engine body 10 has a suction pipe 17 connected to the opposite side of the combustion chamber CC of the suction port 11b and also an exhaust pipe 18 connected to the opposite side of the combustion chamber CC of the exhaust port 11c. Both the suction pipe 17 and the exhaust pipe 18 form a portion of the circulation path 20. The suction pipe 17 is formed in a cylindrical shape and through which a fluid can pass and, as described later, is a suction passage to supply argon (Ar) as a working gas and oxygen ($O_2$) as an oxidizing agent into the combustion chamber CC. That is, when the suction valve 15 is open, the combustion chamber CC has an oxidizing agent and a working gas supplied (sucked) thereinto from the suction pipe 17 via the suction port 11*b*. On the other hand, the exhaust pipe 18 is formed in a cylindrical shape and through which a fluid can pass and, as described later, is an exhaust passage to discharge argon (Ar) as a working gas and water vapor ($H_2O$) from the combustion chamber CC as an exhaust gas after combustion of hydrogen ($H_2$) as fuel. That is, when the exhaust valve 16 is open, the combustion chamber CC discharges the water vapor and working gas as an exhaust gas to the exhaust pipe 18 via the exhaust port 11*c*.

The circulation path 20 can re-supply a working gas contained in an exhaust gas discharged to the exhaust pipe 18 into the combustion chamber CC by causing the working gas to circulate from the exhaust side to the suction side of the combustion chamber CC. The circulation path 20 includes the suction port 11*b* and the exhaust port 11*c* described above and a circulating passage 21 linking the other end of the suction port 11*b* and the other end of the exhaust port 11*c*. Accordingly, space inside the circulation path 20 and inside the combustion chamber CC basically forms a closed space. The circulating passage 21 is formed in a cylindrical shape and through which a fluid can pass and the suction pipe 17 and the exhaust pipe 18 described above form a portion of the circulating passage 21.

The working gas circulation engine 1 has a working gas filled in a closed space composed of the circulation path 20 and the combustion chamber CC. The working gas circulation engine 1 causes the working gas to circulate from the suction pipe 17 and the suction port 11*b* of the circulation path 20 into the combustion chamber CC, from the combustion chamber CC to the exhaust port 11*c* and the exhaust pipe 18 of the circulation path 20 and then, from the exhaust port 11*c* and the exhaust pipe 18 to the suction pipe 17 and the suction port 11*b* again via the circulating passage 21. That is, the circulation path 20 connects the suction side (suction port 11*b* side) and the exhaust side (exhaust port 11*c* side) of the combustion chamber CC outside the combustion chamber CC to re-supply the working gas into the combustion chamber CC without the working gas being released to atmospheric air. Moreover, both ends of the circulation path 20 are communicatively connected to the combustion chamber CC and also an exhaust gas containing water vapor and a working gas can flow out of the combustion chamber CC through one end thereof and an oxidizing agent and a working gas sucked by the combustion chamber CC can flow into the combustion chamber CC through the other end thereof. The working gas circulation engine 1 has an oxidizing agent and a working gas in the circulating passage 21 supplied into the combustion chamber CC via the suction pipe 17 and the suction port 11*b* when the suction valve 15 is open. Also, the working gas circulation engine 1 has an exhaust gas inside the combustion chamber CC discharged to the circulating passage 21 via the exhaust port 11*c* and the exhaust pipe 18 when the exhaust valve 16 is open.

Further, more specifically, the circulating passage 21 of the circulation path 20 includes, for example, a first circulating passage 21*a* and a second circulating passage 21*b*. The first circulating passage 21*a* links the other end of the suction port 11*b* and a working gas exhaust port 60*b* of the condenser 60 described later. The second circulating passage 21*b* links the other end of the exhaust port 11*c* and an exhaust gas supply port 60*a* of the condenser 60. The aforementioned suction pipe 17 forms a portion of the first circulating passage 21*a*, while the exhaust pipe 18 forms a portion of the second circulating passage 21*b*.

A gas whose specific heat ratio is higher than that of air is used as a working gas with which a closed space composed of the circulation path 20 and the combustion chamber CC is filled. For example, a monoatomic gas is used as the working gas. The working gas in the present embodiment is a gas whose specific heat ratio is higher than that of air and, for example, a rare gas such as argon (Ar) and helium (He), which are a monoatomic gas, is used. In the present embodiment, it is assumed, as described above, that argon (Ar) is used.

The oxidizing agent supplying apparatus 30 as oxygen supplying means forms, as described above, the supplying apparatus 2 that supplies a reactant and supplies oxygen as a reactant. The oxidizing agent supplying apparatus 30 in the present embodiment supplies oxygen as an oxidizing agent to the combustion chamber CC via the circulation path 20, here, the suction port 11*b*. The oxidizing agent supplying apparatus 30 includes an oxidizing agent storage tank 31, oxidizing agent injection means 32, an oxidizing agent supplying passage 33, a regulator 34, an oxidizing agent flow meter 35, and a surge tank 36.

The oxidizing agent storage tank 31 stores an oxidizing agent in a high-pressure state. The oxidizing agent injection means 32 injects the oxidizing agent stored in the oxidizing agent storage tank 31 toward the suction port 11*b* to supply the oxidizing agent into the combustion chamber CC via the suction port 11*b*. The oxidizing agent supplying passage 33 links the oxidizing agent storage tank 31 and the oxidizing agent injection means 32. The regulator 34, the oxidizing agent flow meter 35, and the surge tank 36 are provided on the oxidizing agent supplying passage 33. The regulator 34, the oxidizing agent flow meter 35, and the surge tank 36 are provided in the order of the regulator 34, the oxidizing agent flow meter 35, and the surge tank 36 from the upstream side (oxidizing agent storage tank 31 side) toward the downstream side (oxidizing agent injection means 32 side) regarding the supplying direction of oxidizing agent in the oxidizing agent supplying passage 33.

The oxidizing agent injection means 32 in the present embodiment is provided in the cylinder head 11 so that an oxidizing agent can be injected toward the suction port 11*b*. The oxidizing agent injection means 32 is a so-called oxidizing agent injection valve controlled by the electronic control unit 50. The oxidizing agent supplying apparatus 30 in the present embodiment can cause an oxidizing agent, after being injected toward the suction port 11*b* by the oxidizing agent injection means 32 and mixed with a working gas passing through the suction port 11*b*, to be supplied into the combustion chamber CC. As a result, the oxidizing agent will be supplied into the combustion chamber CC together with the working gas via the suction port 11*b* following opening of the suction valve 15. The electronic control unit 50 controls the injection timing and the injection quantity, in other words, the supply rate of fuel in accordance with the operational status such as a driving force (required engine load) and engine speed required by a driver from the working gas circulation engine 1. For example, in normal operation, as described below, the electronic control unit 50 controls the injection timing and the injection quantity (supply rate) of an oxidizing agent in accordance with the injection timing and the injection quantity (supply rate) of fuel set based on the operational status such as the driving force (required engine load) and engine speed required by the driver from the working gas circulation engine 1.

The regulator 34 regulates the pressure on the downstream side (oxidizing agent flow meter 35 side) from the regulator 34 in the oxidizing agent supplying passage 33 to a target pressure according to instructions from the electronic control unit 50. In other words, the regulator 34 controls the flow rate of oxidizing agent in the oxidizing agent supplying passage 33. The oxidizing agent flow meter 35 is means for measuring the flow rate of oxidizing agent in the oxidizing agent supplying passage 33 and measures the flow rate of the oxidizing agent regulated by the regulator 34. A measurement signal of the oxidizing agent flow meter 35 is sent to the electronic control unit 50. The surge tank 36 is used to reduce pulsation generated inside the oxidizing agent supplying passage 33 when an oxidizing agent is injected by the oxidizing agent injection means 32.

Oxygen ($O_2$) is used, as described above, as an oxidizing agent supplied by the oxidizing agent supplying apparatus 30. That is, the oxidizing agent storage tank 31 in the present embodiment stores oxygen as an oxidizing agent at high pressure, for example, about 70 MPa and the oxidizing agent injection means 32 supplies the oxygen ($O_2$) at high pressure into the circulating passage 21.

The fuel supplying apparatus 40 as a hydrogen supplying means forms, as described above, the supplying apparatus 2 that supplies a reactant and supplies hydrogen as a reactant. The fuel supplying apparatus 40 in the present embodiment supplies hydrogen as fuel directly into the combustion chamber CC. The fuel supplying apparatus 40 includes a fuel storage tank 41, fuel injection means 42, a fuel supplying passage 43, a regulator 44, a fuel flow meter 45, and a surge tank 46.

The fuel storage tank 41 stores fuel in a high-pressure state. The fuel injection means 42 injects the fuel stored in the fuel storage tank 41 into the combustion chamber CC. The fuel supplying passage 43 links the fuel storage tank 41 and the fuel injection means 42. The regulator 44, the fuel flow meter 45, and the surge tank 46 are provided on the fuel supplying passage 43. The regulator 44, the fuel flow meter 45, and the surge tank 46 are provided in the order of the regulator 44, the fuel flow meter 45, and the surge tank 46 from the upstream side (fuel storage tank 41 side) toward the downstream side (fuel injection means 42 side) regarding the supplying direction of fuel in the fuel supplying passage 43.

The fuel injection means 42 in the present embodiment is provided in the cylinder head 11 so that fuel can directly be injected into the combustion chamber CC. The fuel injection means 42 is a so-called fuel injection valve controlled by the electronic control unit 50. For example, in normal operation, the electronic control unit 50 controls the injection timing and the injection quantity, in other words, the supply rate of fuel in accordance with the operational status such as the driving force (required engine load) and engine speed required by the driver from the working gas circulation engine 1.

The driving force (required engine load) required by the driver from the working gas circulation engine 1 is set, for example, in normal operation, based on an accelerator opening of a vehicle in which the working gas circulation engine 1 is mounted. The electronic control unit 50 decides the supply rate of fuel allowing to provide the driving force (required engine load) required from the working gas circulation engine 1 at the current engine speed based on, for example, the engine speed of the working gas circulation engine 1 and the required driving force (required engine load). The engine speed of the working gas circulation engine 1 can be detected based on, for example, a crank angle sensor 51. The crank angle sensor 51 detects, for example, a crank angle that is a rotation angle of the crankshaft 19 of the working gas circulation engine 1. The crank angle sensor 51 sends a detection signal to the electronic control unit 50. The electronic control unit 50 distinguishes a suction stroke, compression stroke, expansion stroke, and exhaust stroke in each cylinder based on, for example, the detected crank angle and also calculates the engine speed (rpm) as the rotational speed of the working gas circulation engine 1. The engine speed corresponds, in other words, to the rotational speed of the crankshaft 19 and if the rotational speed of the crankshaft 19 increases, the engine speed corresponding to the rotational speed of the crankshaft 19 also increases.

The regulator 44 regulates the pressure on the downstream side (fuel flow meter 45 and surge tank 46 side) from the regulator 44 in the fuel supplying passage 43 to a set pressure. In other words, the regulator 44 controls the flow rate of fuel in the fuel supplying passage 43. The fuel flow meter 45 is means for measuring the flow rate of fuel in the fuel supplying passage 43 and measures the flow rate of the fuel regulated by the regulator 44. A measurement signal of the fuel flow meter 45 is sent to the electronic control unit 50. The surge tank 46 is used to reduce pulsation generated inside the fuel supplying passage 43 when fuel is injected by the fuel injection means 42.

What is subjected to combustion with an oxidizing agent is used as fuel supplied by the fuel supplying apparatus 40 and, in the present embodiment, as described above, hydrogen ($H_2$) is used. That is, the fuel storage tank 41 in the present embodiment stores hydrogen as fuel at high pressure, for example, about 70 MPa and the fuel injection means 42 directly injects the hydrogen at high pressure into the combustion chamber CC.

The working gas circulation engine 1 in the present embodiment is exemplified as an engine that supplies hydrogen (reactant) as fuel and oxygen (reactant) as an oxidizing agent into the combustion chamber CC to subject hydrogen to diffusion combustion. That is, the working gas circulation engine 1 configured as described above injects hydrogen ($H_2$) at high pressure into a compressed gas (oxygen ($O_2$) and argon (Ar)) formed inside the combustion chamber CC so that a portion of the hydrogen is self-ignited and the hydrogen and compressed gas (oxygen) are subjected to combustion while being diffused and mixed. Hydrogen and oxygen ($O_2$) are combined in the combustion chamber CC to generate water vapor ($H_2O$) by combustion of hydrogen in the combustion chamber CC and also argon (Ar) whose specific heat ratio is large thermally expands. As a result, the piston 13 is pushed down by diffusion combustion of hydrogen and thermal expansion of argon in the working gas circulation engine 1, thereby generating power.

Then, when a process of hydrogen combustion and thermal expansion ends (for example, when the piston 13 is positioned near a bottom dead center), an exhaust gas containing water vapor and argon is discharged from inside the combustion chamber CC to the exhaust pipe 18 via the exhaust port 11c following opening of the exhaust valve 16. It is necessary for argon in the discharged exhaust gas to re-supply into the combustion chamber CC from the suction side after argon being caused to circulate from the exhaust side to the suction side of the combustion chamber CC via the circulation path 20 to enhance thermal efficiency of the engine body 10. However, water vapor in the exhaust gas discharged simultaneously has molecules composed of three atoms (three atom molecules) and has lower specific heat ratio than that of argon composed of single atoms. Thus, if water vapor is caused to circulate through the combustion chamber CC together with argon, thermal efficiency of the engine body 10 may be degraded. Therefore, the working gas circulation engine 1 has means for removing water vapor contained in an exhaust gas provided on the circulation path 20.

More specifically, the working gas circulation engine 1 includes the condenser 60 as means for removing water vapor contained in an exhaust gas flowing through the circulation path 20. Further, the working gas circulation engine 1 includes a cooling water circuit 61, a cooling water pump 62, and a radiator 63.

The condenser 60 is provided in the circulation path 20 to condense water vapor contained in an exhaust gas into condensed water ($H_2O$). The condenser 60 is provided between the second circulating passage 21b and the first circulating passage 21a on the circulating passage 21. That is, the condenser 60 is provided on the exhaust side from the oxidizing agent injection means 32 on the circulation path 20. The condenser 60 also has the cooling water circuit 61 connected thereto so that the cooling water circuit 61 passes therethrough.

The cooling water circuit 61 causes cooling water as a heat exchange medium to circulate through the condenser 60 and cooling water can float therethrough. The cooling water circuit 61 is a closed ring path with cooling water filled therein.

The cooling water pump 62 is provided on a path of the cooling water circuit 61 and cooling water of the cooling water circuit 61 can circulate through the cooling water circuit 61 by the cooling water pump 62 being driven.

The radiator 63 is provided on a path of the cooling water circuit 61 and can cool cooling water circulating through the cooling water circuit 61. The radiator 63 can cool cooling water circulating through the cooling water circuit 61 by a running wind of a vehicle in which the working gas circulation engine 1 is mounted.

Thus, with cooling water circulating through the cooling water circuit 61 and cooled by the radiator 63 being circulated and supplied into the condenser 60, the condenser 60 separates water vapor ($H_2O$) contained in an exhaust gas as condensed water through liquefaction and condensation by cooling the exhaust gas through heat exchange of the cooling water with the exhaust gas flowing through the circulation path 20. That is, the condenser 60 can separate an exhaust gas into argon and condensed water. The cooling water whose temperature has risen by absorbing heat through heat exchange thereof with the exhaust gas of the circulation path 20 in the condenser 60 circulates through the cooling water circuit 61 to pass through the radiator 63 again, at this point heat thereof being dissipated to lower the temperature thereof, that is, the cooling water being cooled. In short, cooling water circulating through the cooling water circuit 61 dissipates heat absorbed from the condenser 60 through the radiator 63.

Then, argon separated by the condenser 60 is discharged to the first circulating passage 21a via the working gas exhaust port 60b of the condenser 60. On the other hand, water vapor separated by the condenser 60 is discharged to a condensed water discharge passage 64 via a condensed water exhaust port 60c of the condenser 60 before being discharged out of the circulation path 20, to the storage tank 70 described later.

The condenser 60 and the radiator 63 have capacities set, when an exhaust gas at a highest possible temperature is discharged from the combustion chamber CC during operation of an engine, to allow water vapor contained in the exhaust gas to lower the temperature thereof to a temperature at which the water vapor is liquefied/condensed (in other words, cooling capabilities of the exhaust gas).

In the working gas circulation engine 1 configured as described above, the piston 13 is pushed down by argon whose specific heat ratio is high being thermally expanded following combustion of hydrogen inside the combustion chamber CC and a cycle composed of the suction stroke, compression stroke, expansion stroke, and exhaust stroke is repeated by the piston 13 being repeatedly reciprocated inside the cylinder bore 12a. The reciprocating motion of the piston 13 is transmitted to the crankshaft 19 by the connecting rod 14 and the reciprocating motion is converted into rotational motion by action of the connecting rod 14 and the crankshaft 19 to rotate the crankshaft 19. In the meantime, the electronic control unit 50 controls the supply rate of hydrogen from the fuel supplying apparatus 40 (the injection quantity of hydrogen from the fuel injection means 42) or the supply rate of oxygen from the oxidizing agent injection means 32) in accordance with the rotational position of the crankshaft 19 or the operational status of the accelerator opening, which is a manipulated variable of an acceleration pedal (not illustrated) provided in the driver's seat of a vehicle.

In the working gas circulation engine 1, the suction valve 15 and the exhaust valve 16 are reciprocated following rotation of the crankshaft 19 and the circulation path 20 and the combustion chamber CC are repeatedly communicatively connected and blocked to repeat the above four strokes by suction and discharge.

That is, the working gas circulation engine 1 opens the suction valve 15 and closes the exhaust valve 16 in the suction stroke and at the same time, sucks oxygen and argon into the combustion chamber CC via the suction port 11b of the circulation path 20 by the piston 13 being moved from a top dead center side to a bottom dead center side.

Next, the working gas circulation engine 1 closes the suction valve 15 to have both the suction valve 15 and the exhaust valve 16 in a closed state in the compression stroke and at the same time, oxygen and argon in the combustion chamber CC are compressed to raise the temperature by the piston 13 being moved from the bottom dead center side to the top dead center side.

Next, the working gas circulation engine 1 injects hydrogen at high pressure into a compressed (oxygen and argon) at high temperature formed inside the combustion chamber CC to self-ignite a portion of the hydrogen and the hydrogen and compressed gas (oxygen) are subjected to combustion while being diffused and mixed. Then, after combustion of hydrogen, argon whose specific heat ratio is high is thermally expanded following the combustion and the piston 13 is pushed down by the diffusion combustion of hydrogen and thermal expansion of argon and the working gas circulation engine 1 thereby generates power.

Next, the working gas circulation engine 1 maintains the closed state of the suction valve 15 while opening the exhaust valve 16 in the exhaust stroke and at the same time, an exhaust gas containing water vapor and argon is discharged from inside the combustion chamber CC to the exhaust pipe 18 via the exhaust port 11c of the circulation path 20 by the piston 13 being moved from the bottom dead center side to the top dead center side.

Then, while the exhaust gas containing water vapor and argon being discharged to the circulation path 20 from inside the combustion chamber CC to circulate through the circulation path 20 toward the combustion chamber CC, the working gas circulation engine 1 liquefies and condenses water vapor in the exhaust gas by the condenser 60 to separate the water vapor. Accordingly, argon as a working gas whose specific heat ratio is high is re-supplied into the combustion chamber CC while water vapor whose specific heat ratio is low is not supplied into the combustion chamber CC and therefore, the working gas circulation engine 1 can perform an operation with high thermal efficiency thanks to the working gas.

Since a working gas is re-supplied into the combustion chamber CC by causing the working gas to circulate from the exhaust side to the suction side of the combustion chamber CC via the circulation path 20, the working gas circulation engine 1 in the present embodiment may not be able to obtain proper starting qualities when started next time depending on the state inside the circulation path 20 when the working gas circulation engine 1 is stopped, for example, the residual state of reactant inside the circulation path 20. If, for example, the reactant is supplied at the supply rate of reactant normally necessary for the next starting from the supplying apparatus 2 in the working gas circulation engine 1 while a reactant remains inside the circulation path 20 when the working gas circulation engine 1 is stopped, the supply rate of the reactant actually supplied into the combustion chamber CC may be excessive by the amount of the reactant remaining inside the circulation path 20. Thus, the ratio of the reactant to the working gas inside the combustion chamber CC deviates from the ratio at which proper starting torque required for starting can be obtained so that proper starting qualities may not be obtainable.

Thus, as illustrated in FIG. 1, the working gas circulation engine 1 in the present embodiment suppresses oversupplying or undersupplying of reactant when the working gas circulation engine 1 is started by including a reactant concentration sensor 3 as concentration detection means capable of detecting the concentration of reactant inside the circulation path 20 and a supply control unit 4 as supply control means that sets the initial supply rate of reactant by the supplying apparatus 2 at least when the engine is started based on the concentration of reactant detected by the reactant concentration sensor 3 before the start of supplying of the reactant by the supplying apparatus 2, thereby adjusting the ratio of the reactant to the working gas inside the combustion chamber CC to a proper ratio that allows to provide proper starting torque required when the engine is started to realize proper starting of the working gas circulation engine 1.

If a plurality of reactants are present, the supply control unit 4 individually sets the initial supply rate of each reactant by the supplying apparatus 2 at least when the engine is started based on the concentration of each reactant detected by the reactant concentration sensor 3 before the start of supplying of each reactant by the supplying apparatus 2. That is, if, like the working gas circulation engine 1 in the present embodiment, oxygen as an oxidizing agent and hydrogen as fuel are used as reactants, the supply control unit 4 preferably sets the initial supply rate of each reactant, that is, each of oxygen and hydrogen by the supplying apparatus 2 at least when the engine is started based on the concentrations of oxygen and hydrogen detected by the reactant concentration sensor 3 before the start of supplying of oxygen and hydrogen by the supplying apparatus 2. Accordingly, when, like the working gas circulation engine 1 in the present embodiment, there are a plurality of reactants, that is, even if oxygen as an oxidizing agent and hydrogen as fuel are used as reactants, the ratio of the reactant to the working gas inside the combustion chamber CC can more precisely be adjusted to a proper ratio that allows to provide proper starting torque required when the engine is started so that the engine can be started properly.

More specifically, the reactant concentration sensor 3 in the present embodiment detects the concentration of a reactant in a circulating gas circulating through the circulation path 20. The reactant concentration sensor 3 in the present embodiment includes an oxygen concentration sensor 52 as oxygen concentration detection means and a hydrogen concentration sensor 53 as hydrogen concentration detection means. The oxygen concentration sensor 52 detects the concentration of oxygen, which is a reactant in a circulating gas circulating through the circulation path 20. The hydrogen concentration sensor 53 detects the concentration of hydrogen, which is a reactant in a circulating gas circulating through the circulation path 20. The oxygen concentration sensor 52 and the hydrogen concentration sensor 53 are both provided in the circulation path 20 and provided on the exhaust side from the oxidizing agent injection means 32 regarding the circulating direction of a working gas in the circulation path 20. Moreover, the oxygen concentration sensor 52 and the hydrogen concentration sensor 53 are provided near the suction port 11*b*. The oxygen concentration sensor 52 and the hydrogen concentration sensor 53 each transmit a detection signal to the electronic control unit 50. It is assumed that the oxygen concentration sensor 52 and the hydrogen concentration sensor 53 are provided near the suction port 11*b*, but the present embodiment is not limited to this and may be provided near the exhaust port 11*c*.

The supply control unit 4 controls driving of the supplying apparatus 2 and controls the supply rate of reactant supplied from the supplying apparatus 2. As described above, the supply control unit 4 sets the supply rate of reactant by the supplying apparatus 2 when the engine is started based on the concentration of the reactant detected by the reactant concentration sensor 3 before the start of supplying of reactant by the supplying apparatus 2. The supply control unit 4 in the present embodiment includes an oxygen supply control unit 54 as oxygen supplying control means and a hydrogen supply control unit 55 as hydrogen supplying control means.

As illustrated in FIG. 1, the working gas circulation engine 1 according to the present embodiment function-conceptually has the oxygen supply control unit 54 and the hydrogen supply control unit 55 forming the supply control unit 4 provided in the electronic control unit (ECU) 50. Further the working gas circulation engine 1 function-conceptually includes a starting status judging unit 56 provided in the electronic control unit 50.

The electronic control unit 50 is constructed by centering on a microcomputer and has a processing unit 50*a*, a storage unit 50*b*, and an input/output unit 50*c*, which are mutually connected and can mutually exchange signals. A drive circuit (not illustrated) to drive each unit of a vehicle including the working gas circulation engine 1 and various sensors described above are connected to the input/output unit 50*c* and the input/output unit 50*c* inputs/outputs signals with these sensors. The storage unit 50*b* stores a computer program to control each unit of the working gas circulation engine 1. The storage unit 50*b* can be constructed from a hard disk apparatus, magneto-optical disk apparatus, nonvolatile memory (a storage medium like CD-ROM from which data can be only read) like a flash memory, volatile memory like a RAM (Random Access Memory), or a combination of these. The processing unit 50*a* is constructed from a memory and CPU (Central Processing Unit) (not illustrated) and has at least the oxygen supply control unit 54, the hydrogen supply control unit 55, and the starting status judging unit 56 constituting the supply control unit 4 described above. Various kinds of control by the electronic control unit 50 are exercised by the computer program being read into a memory incorporated in the processing unit 50*a* by the processing unit 50*a* to perform operations and sending a control signal in accordance with an operation result based on a detection result by a sensor provided in each unit. The processing unit 50*a* stores numeric values halfway through operations in the storage unit 50*b* or fetches stored numeric values to continue with operations. When each unit of the working gas circulation engine 1 is controlled, instead of the computer program, dedicated hardware that is different from the electronic control unit 50 may be used for control.

The oxygen supply control unit 54 constituting the supply control unit 4 controls driving of the oxidizing agent supplying apparatus 30 of the supplying apparatus 2 and controls the supply rate and supplying timing of oxygen, which is a reactant supplied from the oxidizing agent supplying apparatus 30. Further, the oxygen supply control unit 54 controls the supply rate and supplying timing (injection timing) of oxygen from the oxidizing agent supplying apparatus 30 by controlling driving of the oxidizing agent injection means 32 of the oxidizing agent supplying apparatus 30 and the injection quantity of oxygen from the oxidizing agent injection means 32.

The hydrogen supply control unit 55 constituting the supply control unit 4 controls the fuel supplying apparatus 40 of the supplying apparatus 2 and controls the supply rate and supplying timing of hydrogen, which is a reactant supplied from the fuel supplying apparatus 40. Further, the hydrogen supply control unit 55 controls the supply rate and supplying timing (injection timing) of oxygen from the fuel supplying apparatus 40 by controlling driving of the fuel injection means 42 of the fuel supplying apparatus 40 and the injection quantity of oxygen from the fuel injection means 42.

The starting status judging unit 56 judges the starting status of the working gas circulation engine 1. The starting status judging unit 56 acquires the engine speed of the working gas circulation engine 1 based on, for example, a detection signal of the crank angle sensor 51 and can judge whether the working gas circulation engine 1 is being started and starting of the working gas circulation engine 1 is completed, that is, whether the working gas circulation engine 1 is in post starting can be judged based on the engine speed.

The time for starting the working gas circulation engine 1 in the present embodiment will be described with reference to the time chart in FIG. 2. Time T1 for starting the working gas circulation engine 1 in the present embodiment is a period between a point t1 before driving of the crankshaft 19 is started by a starter (not illustrated) such as a cell motor and reciprocating motion inside the cylinder bore 12*a* of the piston 13 is started and a point t4 when the engine speed exceeds a predetermined engine speed set in advance. That is, for the working gas circulation engine 1, the point t1 is a starting start point and the point t4 is a starting end point and starting control of the working gas circulation engine 1 described below is basically exercised between the starting start point t1 and the starting end point t4. The starting start point t1 is, for example, a point when IG is turned on or the start button is switched on. The period between the starting start point t1 and the starting end point t4 of the time T1 for starting the working gas circulation engine 1 contains at least points t2 and t2' when initial supplying of oxygen or hydrogen from the supplying apparatus 2 starts and a point t3 when the first combustion of hydrogen, that is, the first cycle occurs. That is, in the working gas circulation engine 1, the starter is driven immediately after the starting start point t1, then supplying of oxygen and hydrogen from the supplying apparatus 2 is started at the supplying start points t2 and t2' respectively, combustion of hydrogen is started at the first cycle point t3 accompanied by an ever faster engine speed, and when the engine speed exceeds the predetermined engine speed set in advance at the starting end point t4, the time T1 for starting from the starting point t1 to the starting end point t4 ends. On the other hand, post starting T2 of the working gas circulation engine 1 is a period after the starting end point t4 when the engine speed exceeds the predetermined engine speed set in advance and the working gas circulation engine 1 is switched from starting control to normal control at the starting end point t4 so that normal control is exercised in the subsequent post starting T2 after starting.

The starting status judging unit 56 in the present embodiment illustrated in FIG. 1 further detects and judges the supply start point and the number of times of supplying (number of times of injection) of oxygen and hydrogen based on detection signals of various sensors and control signals of various apparatuses as judgments of the starting status of the working gas circulation engine 1.

Then, based on the concentration of oxygen detected by the oxygen concentration sensor 52 before supplying of oxygen being started by the oxidizing agent supplying apparatus 30, the oxygen supply control unit 54 in the present embodiment sets at least the initial supply rate of oxygen by the oxidizing agent supplying apparatus 30 in the time for starting. Before supplying of oxygen being started by the oxidizing agent supplying apparatus 30 is a period before the supplying start point t2 in FIG. 2 described above and includes, for example, a period before the starting start point t1. That is, before supplying of oxygen being started by the oxidizing agent supplying apparatus 30 includes a period between a point when the last operation of the working gas circulation engine 1 ends and the working gas circulation engine 1 stops and the supplying start point t2. Then, the oxygen supply control unit 54 sets at least the initial supply rate of oxygen by the oxidizing agent supplying apparatus 30 in the time T1 for starting based on the concentration of oxygen detected by the oxygen concentration sensor 52 before the supplying start point t2. That is, the oxygen supply control unit 54 sets the supply rate of oxygen by the oxidizing agent supplying apparatus 30 in the time T1 for starting based on the concentration of oxygen remaining in the circulation path 20 before the supplying start point of the next starting after the stop of the working gas circulation engine 1 and supplies oxygen at the set supply rate by the oxidizing agent supplying apparatus 30 at the supplying start point t2.

The oxygen supply control unit 54 only needs to be configured to allow to set at least the initial supply rate of oxygen by the oxidizing agent supplying apparatus 30 in the time T1 for starting based on the concentration of oxygen detected by the oxygen concentration sensor 52 before the supplying start point t2. The oxygen supply control unit 54 may set the supply rate of oxygen by the oxidizing agent supplying apparatus 30 based on, for example, the concentration of oxygen detected by the oxygen concentration sensor 52 before the supplying start point t2 in a predetermined number of times of supplying of oxygen by the oxidizing agent supplying apparatus 30 in an early period of the time for starting including the first supplying of oxygen by the oxidizing agent supplying apparatus 30 in the time T1 for starting or may set the supply rate of oxygen by the oxidizing agent supplying apparatus 30 based on the current concentration of oxygen detected by the oxygen concentration sensor 52 in the second or subsequent supplying of oxygen by the oxidizing agent supplying apparatus 30 in the time T1 for starting.

The oxygen supply control unit 54 determines at least the initial supply rate of oxygen by the oxidizing agent supplying apparatus 30 in the time T1 for starting based on, for example, an oxygen supply rate map m01 illustrated in FIG. 3. In the oxygen supply rate map m01, the horizontal axis denotes the concentration of oxygen and the vertical axis the supply rate of oxygen. The oxygen supply rate map m01 shows the relationship between the concentration of oxygen and the supply rate of oxygen. In the oxygen supply rate map m01, the supply rate of oxygen by the oxidizing agent supplying apparatus 30 in the time T1 for starting decreases with an increasing concentration of oxygen detected by the oxygen concentration sensor 52 before the start of supplying of oxygen by the oxidizing agent supplying apparatus 30, that is, an increasing concentration of oxygen remaining inside the circulation path 20. The relationship between the supply rate of oxygen and the concentration of oxygen is preset for the oxygen supply rate map m01 based on the quantity of hydrogen in accordance with the quantity of heat necessary for the time for starting and environmental conditions and stored in the storage unit 50b. The oxygen supply control unit 54 determines at least the initial supply rate of oxygen by the oxidizing agent supplying apparatus 30 in the time T1 for starting from the concentration of oxygen detected by the oxygen concentration sensor 52 before the start of supplying of oxygen by the oxidizing agent supplying apparatus 30 based on the oxygen supply rate map m01. Then, the oxygen supply control unit 54 controls the supply rate of oxygen from the oxidizing agent supplying apparatus 30 by controlling driving of the oxidizing agent injection means 32 of the oxidizing agent supplying apparatus 30 and the injection quantity of oxygen from the oxidizing agent injection means 32 based on the supply rate of oxygen by the oxidizing agent supplying apparatus 30 in the time for starting in accordance with the concentration of oxygen before the start of supplying of oxygen by the oxidizing agent supplying apparatus 30.

In the present embodiment, the oxygen supply control unit 54 determines the supply rate of oxygen by the oxidizing agent supplying apparatus 30 in the time for starting by using the oxygen supply rate map m01, but the present embodiment is not limited to this. The oxygen supply control unit 54 may determine supplying of oxygen by the oxidizing agent supplying apparatus 30 in the time for starting based on, for example, a formula corresponding to the oxygen supply rate map m01. This also applies to various maps described below.

As a result, the working gas circulation engine 1 can obtain proper starting qualities in the time for starting regardless of the residual state of oxygen as a reactant inside the circulation path 20 after the stop of the working gas circulation engine 1 by at least the initial supply rate of oxygen by the oxidizing agent supplying apparatus 30 in the time T1 for starting being controlled by the oxygen supply control unit 54 based on the concentration of oxygen detected by the oxygen concentration sensor 52 before the start of supplying of oxygen by the oxidizing agent supplying apparatus 30. That is, the working gas circulation engine 1 can supply oxygen into the combustion chamber CC in proper quantities regarding the supply rate of oxygen normally needed for starting by increasing/decreasing at least the initial supply rate of oxygen by the oxidizing agent supplying apparatus 30 in the time T1 for starting when the engine is started next time in accordance with the concentration of oxygen detected by the oxygen concentration sensor 52 before the start of supplying of oxygen by the oxidizing agent supplying apparatus 30 in a state in which oxygen as a reactant remains inside the circulation path 20 after the stop of the working gas circulation engine 1. Therefore, the working gas circulation engine 1 can prevent the ratio of oxygen as a reactant in the combustion chamber CC to the working gas from deviating from the ratio at which proper starting torque required for starting can be obtained and adjust the ratio to a proper ratio that allows to provide proper starting torque required for starting so that proper starting can be assured.

More specifically, the working gas circulation engine 1 can prevent the supply rate of oxygen (sum of the residual quantity of oxygen inside the circulation path 20 and the supply rate of oxygen by the oxidizing agent supplying apparatus 30) actually supplied into the combustion chamber CC from being excessive with respect to the supply rate needed for starting by the initial supply rate of oxygen by the oxidizing agent supplying apparatus 30 in the time T1 for starting being relatively decreased by the oxygen supply control unit 54 with a relatively increasing concentration of oxygen detected by the oxygen concentration sensor 52 before the start of supplying of oxygen by the oxidizing agent supplying apparatus 30, that is, a relatively increasing concentration of oxygen remaining inside the circulation path 20. Therefore, the working gas circulation engine 1 can prevent supplying of oxygen into the combustion chamber CC from being excessive in the time T1 for starting and consequently, torque actually generated can be prevented from being insufficient with respect to proper starting torque required for starting with a lower ratio of argon inside the combustion chamber CC so that proper starting can be assured.

On the other hand, the working gas circulation engine 1 can prevent the supply rate of oxygen (sum of the residual quantity of oxygen inside the circulation path 20 and the supply rate of oxygen by the oxidizing agent supplying apparatus 30) actually supplied into the combustion chamber CC from being insufficient with respect to the supply rate needed for starting by the initial supply rate of oxygen by the oxidizing agent supplying apparatus 30 in the time T1 for starting being relatively increased by the oxygen supply control unit 54 with a relatively decreasing concentration of oxygen detected by the oxygen concentration sensor 52 before the start of supplying of oxygen by the oxidizing agent supplying apparatus 30, that is, a relatively decreasing concentration of oxygen remaining inside the circulation path 20. Therefore, the working gas circulation engine 1 can prevent supplying of oxygen into the combustion chamber CC from being insufficient in the time T1 for starting and consequently, the ratio of argon inside the combustion chamber CC can be prevented from increasing too much and torque actually generated can be prevented from being excessive with respect to proper starting torque required for starting so that proper starting can be assured. Moreover, the working gas circulation engine 1 can prevent supplying of oxygen into the combustion chamber CC from being insufficient in the time T1 for starting and consequently, oxygen necessary for combustion of hydrogen inside the combustion chamber CC can be prevented from being insufficient due to an increasing ratio of hydrogen and torque actually generated can be prevented from being insufficient with respect to proper starting torque required for starting so that proper starting can be assured and also hydrogen not subjected to combustion can be prevented from being accumulated in the circulation path 20.

If the concentration of oxygen detected by the oxygen concentration sensor 52 before the start of supplying of oxygen by the oxidizing agent supplying apparatus 30 is 0, that is, no oxygen as a reactant remains inside the circulation path 20 after the stop of the working gas circulation engine 1, the oxygen supply control unit 54 sets the supply rate of oxygen normally needed for starting unchanged as the initial supply rate of oxygen by the oxidizing agent supplying apparatus 30 in the time T1 for starting.

Next, based on the concentration of hydrogen detected by the hydrogen concentration sensor 53 before supplying of hydrogen being started by the fuel supplying apparatus 40, the hydrogen supply control unit 55 in the present embodiment sets at least the initial supply rate of hydrogen by the fuel supplying apparatus 40 in the time T1 for starting. Before supplying of hydrogen being started by the fuel supplying apparatus 40 is a period before the supplying start point t2' in FIG. 2 described above and includes, for example, a period before the starting start point t1. That is, before supplying of hydrogen being started by the fuel supplying apparatus 40 includes a period between a point when the last operation of the working gas circulation engine 1 ends and the working gas circulation engine 1 stops and the supplying start point t2'. Then, the hydrogen supply control unit 55 sets at least the initial supply rate of hydrogen by the fuel supplying apparatus 40 in the time T1 for starting based on the concentration of hydrogen detected by the hydrogen concentration sensor 53 before the supplying start point t2'. That is, the hydrogen supply control unit 55 sets the supply rate of hydrogen by the fuel supplying apparatus 40 in the time T1 for starting based on the concentration of hydrogen remaining in the circulation path 20 before the supplying start point of the next starting after the stop of the working gas circulation engine 1 and supplies hydrogen at the set supply rate by the fuel supplying apparatus 40 at the supplying start point t2'.

The hydrogen supply control unit 55 only needs to be configured to allow to set at least the initial supply rate of hydrogen by the fuel supplying apparatus 40 in the time T1 for starting based on the concentration of hydrogen detected by the hydrogen concentration sensor 53 before the supplying start point t2'. The hydrogen supply control unit 55 may set the supply rate of hydrogen by the fuel supplying apparatus 40 based on, for example, the concentration of hydrogen detected by the hydrogen concentration sensor 53 before the supplying start point t2' in a predetermined number of times of supplying of hydrogen by the fuel supplying apparatus 40 in an early period of the time for starting including the first supplying of hydrogen by the fuel supplying apparatus 40 in the time T1 for starting or may set the supply rate of hydrogen by the fuel supplying apparatus 40 based on the current concentration of hydrogen detected by the hydrogen concentration sensor 53 in the second or subsequent supplying of hydrogen by the fuel supplying apparatus 40 in the time T1 for starting.

The hydrogen supply control unit 55 determines at least the initial supply rate of hydrogen by the fuel supplying apparatus 40 in the time T1 for starting based on, for example, a hydrogen supply rate map m02 illustrated in FIG. 4. In the hydrogen supply rate map m02, the horizontal axis denotes the concentration of hydrogen and the vertical axis the supply rate of hydrogen. The hydrogen supply rate map m02 shows the relationship between the concentration of hydrogen and the supply rate of hydrogen. In the hydrogen supply rate map m02, the supply rate of hydrogen by the fuel supplying apparatus 40 in the time T1 for starting decreases with an increasing concentration of hydrogen detected by the hydrogen concentration sensor 53 before the start of supplying of hydrogen by the fuel supplying apparatus 40, that is, an increasing concentration of hydrogen remaining inside the circulation path 20. The relationship between the supply rate of hydrogen and the concentration of hydrogen is preset for the hydrogen supply rate map m02 based on the quantity of hydrogen in accordance with the quantity of heat necessary for the time for starting and environmental conditions and stored in the storage unit 50*b*. The hydrogen supply control unit 55 determines at least the initial supply rate of hydrogen by the fuel supplying apparatus 40 in the time T1 for starting from the concentration of hydrogen detected by the hydrogen concentration sensor 53 before the start of supplying of hydrogen by the fuel supplying apparatus 40 based on the hydrogen supply rate map m02. Then, the hydrogen supply control unit 55 controls the supply rate of hydrogen from the fuel supplying apparatus 40 by controlling driving of the fuel injection means 42 of the fuel supplying apparatus 40 and the injection quantity of hydrogen from the fuel injection means 42 based on the supply rate of hydrogen by the fuel supplying apparatus 40 in the time for starting in accordance with the concentration of hydrogen before the start of supplying of hydrogen by the fuel supplying apparatus 40.

As a result, the working gas circulation engine 1 can obtain proper starting qualities in the time for starting regardless of the residual state of hydrogen as a reactant inside the circulation path 20 after the stop of the working gas circulation engine 1 by at least the initial supply rate of hydrogen by the fuel supplying apparatus 40 in the time T1 for starting being controlled by the hydrogen supply control unit 55 based on the concentration of hydrogen detected by the hydrogen concentration sensor 53 before the start of supplying of hydrogen by the fuel supplying apparatus 40. That is, the working gas circulation engine 1 can supply hydrogen into the combustion chamber CC in proper quantities regarding the supply rate of hydrogen normally needed for starting by increasing/decreasing at least the initial supply rate of hydrogen by the fuel supplying apparatus 40 in the time T1 for starting when the engine is started next time in accordance with the concentration of hydrogen detected by the hydrogen concentration sensor 53 before the start of supplying of hydrogen by the fuel supplying apparatus 40 in a state in which hydrogen as a reactant remains inside the circulation path 20 after the stop of the working gas circulation engine 1. Therefore, the working gas circulation engine 1 can prevent the ratio of hydrogen as a reactant in the combustion chamber CC to the working gas from deviating from the ratio at which proper starting torque required for starting can be obtained and adjust the ratio to a proper ratio that allows to provide proper starting torque required for starting so that proper starting can be assured.

More specifically, the working gas circulation engine 1 can prevent the supply rate of hydrogen (the residual quantity of hydrogen+the supply rate of hydrogen by the fuel supplying apparatus 40) actually supplied into the combustion chamber CC from being excessive with respect to the supply rate needed for starting by the initial supply rate of hydrogen by the fuel supplying apparatus 40 in the time T1 for starting being relatively decreased by the hydrogen supply control unit 55 with a relatively increasing concentration of hydrogen detected by the hydrogen concentration sensor 53 before the start of supplying of hydrogen by the fuel supplying apparatus 40, that is, a relatively increasing concentration of hydrogen remaining inside the circulation path 20. Therefore, the working gas circulation engine 1 can prevent supplying of hydrogen into the combustion chamber CC from being excessive in the time for starting and consequently, torque actually generated can be prevented from being insufficient with respect to proper starting torque required for starting with an increased quantity of hydrogen inside the combustion chamber CC so that proper starting can be assured. The working gas circulation engine 1 can also prevent hydrogen from being excessively supplied into the combustion chamber CC in the time for starting and thus, torque actually generated can be prevented from being insufficient with respect to proper starting torque required for starting with a lower ratio of argon inside the combustion chamber CC so that proper starting can be assured. The working gas circulation engine 1 can also prevent hydrogen from being excessively supplied into the combustion chamber CC in the time for starting and thus, oxygen necessary for combustion of hydrogen inside the combustion chamber CC can be prevented from being insufficient due to a lower ratio of oxygen inside the combustion chamber CC and torque actually generated can be prevented from being insufficient with respect to proper starting torque required for starting so that proper starting can be assured and also hydrogen not subjected to combustion can be prevented from being accumulated in the circulation path 20.

On the other hand, the working gas circulation engine 1 can prevent the supply rate of hydrogen (the residual quantity of hydrogen+the supply rate of hydrogen by the fuel supplying apparatus 40) actually supplied into the combustion chamber CC from being insufficient with respect to the supply rate needed for starting by the initial supply rate of hydrogen by the fuel supplying apparatus 40 in the time T1 for starting being relatively increased by the hydrogen supply control unit 55 with a relatively decreasing concentration of hydrogen detected by the hydrogen concentration sensor 53 before the start of supplying of hydrogen by the fuel supplying apparatus 40, that is, a relatively decreasing concentration of hydrogen remaining inside the circulation path 20. Therefore, the working gas circulation engine 1 can prevent supplying of hydrogen into the combustion chamber CC from being insufficient in the time for starting and consequently, torque actually generated can be prevented from being insufficient with respect to proper starting torque required for starting with a decreased quantity of hydrogen inside the combustion chamber CC so that proper starting can be assured. Moreover, the working gas circulation engine 1 can prevent supplying of hydrogen into the combustion chamber CC from being insufficient in the time for starting and consequently, the ratio of argon inside the combustion chamber CC can be prevented from increasing too much and torque actually generated can be prevented from being excessive with respect to proper starting torque required for starting so that proper starting can be assured.

If the concentration of hydrogen detected by the hydrogen concentration sensor 53 before the start of supplying of hydrogen by the fuel supplying apparatus 40 is 0, that is, no hydrogen as a reactant remains inside the circulation path 20 after the stop of the working gas circulation engine 1, the hydrogen supply control unit 55 sets the supply rate of hydrogen normally needed for starting unchanged as the initial supply rate of hydrogen by the fuel supplying apparatus 40 in the time T1 for starting.

Oxygen supplying control in the time for starting the working gas circulation engine 1 according to the present embodiment will now be described with reference to the flow chart in FIG. 5. The oxygen supplying control in the time for starting is control exercised by the starting control of the working gas circulation engine 1 and is basically exercised between the starting start point t1 and the starting end point t4. A control routine thereof is repeatedly executed in a control period of several milliseconds to several tens milliseconds. The oxygen supplying control described with reference FIG. 5 is basically the oxygen supplying control of the first supplying of oxygen in the time T1 for starting.

First, the starting status judging unit 56 of the electronic control unit 50 acquires the engine speed of the working gas circulation engine 1 based on a detection signal of the crank angle sensor 51 and judges whether the working gas circulation engine 1 is in the time for starting based on the acquired engine speed (S100). The starting status judging unit 56 judges whether the working gas circulation engine 1 is in the time for starting based on whether the engine speed is higher than a predetermined engine speed set in advance.

If the starting status judging unit 56 judges that the working gas circulation engine 1 is not in the time for starting (S100: No), that is, the working gas circulation engine 1 is after starting, the electronic control unit 50 terminates the current control period to move to the next one and also exercises, for example, normal oxygen supplying control.

If the starting status judging unit 56 judges that the working gas circulation engine 1 is in the time for starting (S100: Yes), the starting status judging unit 56 judges whether the present time is before the start of supplying of oxygen by the oxidizing agent supplying apparatus 30 is started (before initial supplying of oxygen) (S101).

If the starting status judging unit 56 judges that the present time is after supplying of oxygen by the oxidizing agent supplying apparatus 30 is started (S101: No), the electronic control unit 50 terminates the current control period to move to the next one and exercises, for example, the second or subsequent oxygen supplying control.

If the starting status judging unit 56 judges that the present time is before the start of supplying of oxygen by the oxidizing agent supplying apparatus 30 (S101: Yes), the oxygen supply control unit 54 acquires the concentration of oxygen detected by the oxygen concentration sensor 52 (the concentration of oxygen in the circulation path 20 before the start of supplying of oxygen by the oxidizing agent supplying apparatus 30) (S102).

Next, the oxygen supply control unit 54 calculates the initial supply rate of oxygen by the oxidizing agent supplying apparatus 30 in the time for starting from the concentration of oxygen acquired at S102 before the start of supplying of oxygen by the oxidizing agent supplying apparatus 30 based on, for example, the oxygen supply rate map m01 (S103).

Next, the oxygen supply control unit 54 judges whether the present time is the supplying timing of oxygen (S104). The oxygen supply control unit 54 determines which stroke of the suction stroke, compression stroke, expansion stroke, and exhaust stroke the working gas circulation engine 1 is in from, for example, a detection result of the crank angle sensor 51 and then judges whether the present time is the supplying timing of oxygen by the oxidizing agent supplying apparatus 30 based on the determination. If, for example, the current stroke of the working gas circulation engine 1 is the suction stroke or immediately before the suction stroke, the oxygen supply control unit 54 judges that the present time is the supplying timing of oxygen by the oxidizing agent supplying apparatus 30.

If the oxygen supply control unit 54 judges that the present time is not the supplying timing of oxygen (S104: No), the electronic control unit 50 terminates the current control period to move to the next one.

If the oxygen supply control unit 54 judges that the present time is the supplying timing of oxygen (S104: Yes), the oxygen supply control unit 54 controls the supply rate of oxygen from the oxidizing agent supplying apparatus 30 by controlling driving of the oxidizing agent injection means 32 of the oxidizing agent supplying apparatus 30 and the injection quantity of oxygen from the oxidizing agent injection means 32 (S105) before terminating the current control period to move to the next one.

Next, hydrogen supplying control in the time for starting the working gas circulation engine 1 according to the present embodiment will be described with reference to the flow chart in FIG. 6. The hydrogen supplying control in the time for starting is control exercised by the starting control of the working gas circulation engine 1 and is basically exercised between the starting start point t1 and the starting end point t4. A control routine thereof is repeatedly executed in a control period of several milliseconds to several tens milliseconds. The hydrogen supplying control described with reference FIG. 6 is basically the hydrogen supplying control of the first supplying of hydrogen in the time T1 for starting.

First, the starting status judging unit 56 of the electronic control unit 50 acquires the engine speed of the working gas circulation engine 1 based on a detection signal of the crank angle sensor 51 and judges whether the working gas circulation engine 1 is in the time for starting based on the acquired engine speed (S200).

If the starting status judging unit 56 judges that the working gas circulation engine 1 is not in the time for starting (S200: No), that is, the working gas circulation engine 1 is after starting, the electronic control unit 50 terminates the current control period to move to the next one and also exercises, for example, normal hydrogen supplying control.

If the starting status judging unit 56 judges that the working gas circulation engine 1 is in the time for starting (S200: Yes), the starting status judging unit 56 judges whether the present time is before the start of supplying of hydrogen by the fuel supplying apparatus 40 is started (before initial supplying of hydrogen) (S201).

If the starting status judging unit 56 judges that the present time is after the start of supplying of hydrogen by the fuel supplying apparatus 40 (S201: No), the electronic control unit 50 terminates the current control period to move to the next one and exercises, for example, the second or subsequent hydrogen supplying control.

If the starting status judging unit 56 judges that the time for starting is before the start of supplying of hydrogen by the fuel supplying apparatus 40 (S201: Yes), the hydrogen supply control unit 55 acquires the concentration of hydrogen detected by the hydrogen concentration sensor 53 (the concentration of hydrogen in the circulation path 20 before the start of supplying of hydrogen by the fuel supplying apparatus 40) (S202).

Next, the hydrogen supply control unit 55 calculates the initial supply rate of hydrogen by the fuel supplying apparatus 40 in the time for starting from the concentration of hydrogen acquired at S202 before the start of supplying of hydrogen by the fuel supplying apparatus 40 based on, for example, the hydrogen supply rate map m02 (S203).

Next, the hydrogen supply control unit 55 judges whether the present time is the supplying timing of hydrogen (S204). The hydrogen supply control unit 55 determines which stroke of the suction stroke, compression stroke, expansion stroke, and exhaust stroke the working gas circulation engine 1 is in from, for example, a detection result of the crank angle sensor 51 and then judges whether the present time is the supplying timing of hydrogen by the fuel supplying apparatus 40 based on the determination. If, for example, the current stroke of the working gas circulation engine 1 is the suction stroke or immediately before the suction stroke, the hydrogen supply control unit 55 judges that the present time is the supplying timing of hydrogen by the fuel supplying apparatus 40.

If the hydrogen supply control unit 55 judges that the present time is not the supplying timing of hydrogen (S204: No), the electronic control unit 50 terminates the current control period to move to the next one.

If the hydrogen supply control unit 55 judges that the present time is the supplying timing of hydrogen (S204: Yes), the hydrogen supply control unit 55 controls the supply rate of hydrogen from the fuel injection means 42 of the fuel supplying apparatus 40 and the injection quantity of hydrogen from the fuel injection means 42 (S205) before terminating the current control period to move to the next one.

According to the working gas circulation engine 1 in the above embodiment of the present invention, a combustion chamber CC into which a reactant and a working gas whose specific heat ratio is higher than that of air are supplied and in which the working gas can expand following a reaction of the reactant, the circulation path 20 capable of re-supplying the working gas into the combustion chamber CC by causing the working gas to circulate from the exhaust side to the suction side of the combustion chamber CC, the supplying apparatus 2 to supply a reactant, the reactant concentration sensor 3 capable of detecting the concentration of a reactant in the circulation path, and the supply control unit 4 that sets at least the initial supply rate of reactant by the supplying apparatus 2 in the time T1 for starting based on the concentration of the reactant detected by the reactant concentration sensor 3 before the start of supplying of the reactant by the supplying apparatus 2 are included.

Therefore, the working gas circulation engine 1 can supply the reactant into the combustion chamber CC in proper quantities with respect to the supply rate of reactant normally needed for starting regardless of the residual state of reactant inside the circulation path 20 after the stop of the last operation of the working gas circulation engine 1 by at least the initial supply rate of the reactant by the supplying apparatus 2 being controlled by the supply control unit 4 in the time T1 for starting based on the concentration of the reactant detected by the reactant concentration sensor 3 before the start of supplying of the reactant by the supplying apparatus 2 and can adjust the ratio of the reactant to the working gas inside the combustion chamber CC to a proper ratio capable of providing proper starting torque required for starting in the time for starting so that proper starting can be assured.

Further, according to the working gas circulation engine 1 in the above embodiment of the present invention, the supplying apparatus 2 supplies oxygen as a reactant, the reactant concentration sensor 3 can detect the concentration of oxygen, and the supply control unit 4 sets at least the initial supply rate of oxygen by the supplying apparatus 2 in the time for starting based on the concentration of oxygen detected by the reactant concentration sensor 3 before the start of supplying of oxygen by the supplying apparatus 2. Therefore, oxygen can be supplied into the combustion chamber CC in proper quantities with respect to the supply rate of oxygen normally needed for starting regardless of the residual state of oxygen inside the circulation path 20 after the stop of the last operation of the working gas circulation engine 1 by at least the initial supply rate of oxygen by the supplying apparatus 2 being controlled by the supply control unit 4 in the time T1 for starting based on the concentration of oxygen detected by the reactant concentration sensor 3 before the start of supplying of oxygen by the supplying apparatus 2 and the ratio of oxygen to a working gas inside the combustion chamber CC can be adjusted to a proper ratio capable of providing proper starting torque required for starting in the time for starting so that proper starting can be assured.

Further, according to the working gas circulation engine 1 in the above embodiment of the present invention, the supplying apparatus 2 supplies hydrogen as a reactant, the reactant concentration sensor 3 can detect the concentration of hydrogen, and the supply control unit 4 sets at least the initial supply rate of hydrogen by the supplying apparatus 2 based on the concentration of hydrogen detected by the reactant concentration sensor 3 before the start of supplying of hydrogen by the supplying apparatus 2. Therefore, oxygen can be supplied into the combustion chamber CC in proper quantities with respect to the supply rate of hydrogen normally needed for starting regardless of the residual state of hydrogen inside the circulation path 20 after the stop of the last operation of the working gas circulation engine 1 by at least the initial supply rate of hydrogen by the supplying apparatus 2 being controlled by the supply control unit 4 in the time T1 for starting based on the concentration of hydrogen detected by the reactant concentration sensor 3 before the start of supplying of hydrogen by the supplying apparatus 2 and the ratio of hydrogen to the working gas inside the combustion chamber CC can be adjusted to a proper ratio capable of providing proper starting torque required for starting in the time for starting so that proper starting can be assured.

Further, according to the working gas circulation engine 1 in the above embodiment of the present invention, if there are a plurality of reactants, that is, there are oxygen and hydrogen as reactants, the supply control unit 4 sets at least each initial supply rate of oxygen and hydrogen by the supplying apparatus 2 in the time T1 for starting based on the concentrations of oxygen and hydrogen detected by the reactant concentration sensor 3 before the start of supplying of each of oxygen and hydrogen by the supplying apparatus 2 to each reactant, that is, oxygen and hydrogen respectively. Therefore, when there are a plurality of reactants, that is, even if oxygen as an oxidizing agent and hydrogen as fuel are used as reactants, the working gas circulation engine 1 can precisely adjust the ratio of reactants inside the combustion chamber CC, that is, oxygen and hydrogen to a proper ratio that can provided proper starting torque required for starting so that proper starting can be assured.

In the above description, it is assumed that the supply control unit 4 sets at least each initial supply rate of oxygen and hydrogen by the supplying apparatus 2 in the time T1 for starting based on the concentrations of oxygen and hydrogen detected by the reactant concentration sensor 3 before the start of supplying of each of oxygen and hydrogen by the supplying apparatus 2 to each of oxygen and hydrogen as reactants, but the present invention is not limited to this and it is not necessarily needed to set the initial supply rates by the supplying apparatus 2 in the time T1 for starting based on concentrations before the start of supplying for all reactants. If, for example, the working gas circulation engine 1 is operated immediately before being stopped in an operational state to allow only one of oxygen and hydrogen to remain inside the circulation path 20, the supply control unit 4 may set the initial supply rate by the supplying apparatus 2 in the time T1 for starting based on the concentration before the start of supplying only for the concerned reactant and even in such a case, the working gas circulation engine 1 can adjust the ratio of the reactant to the working gas inside the combustion chamber CC to a proper ratio capable of providing proper starting torque required for starting in the time for starting so that proper starting can be assured.

(Second Embodiment)

Figure 7:
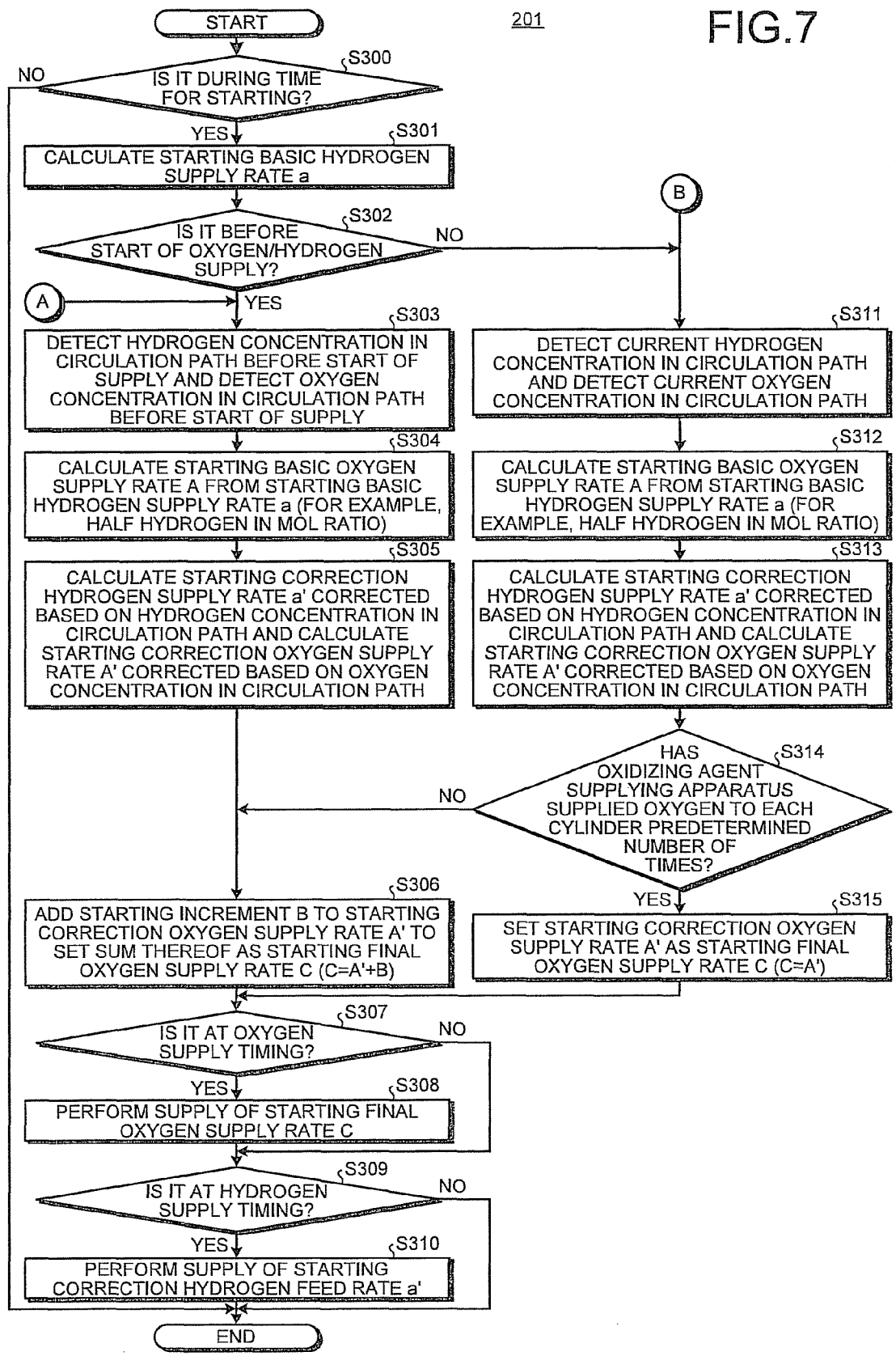
FIG. 7 is a flow chart explaining oxygen/hydrogen supplying control when a working gas circulation engine according to a second embodiment of the present invention is started.

FIG. 7 is a flow chart explaining oxygen/hydrogen supplying control when a working gas circulation engine according to a second embodiment of the present invention is started. The working gas circulation engine according to the second embodiment has substantially the same configuration as that of the working gas circulation engine according to the first embodiment, but is different therefrom in that the supply rate of oxygen by the oxygen supplying means in an early period of the time for starting is set to a supply rate at which oxygen remains in a gas after combustion. In addition, the same description will not be repeated if possible regarding components, operations, and effects that are common to those of the above embodiment and the same reference numerals are attached. Regarding each component of the working gas circulation engine according to the second embodiment, FIG. 1 or the like.

In a working gas circulation engine 201 in the present embodiment, the oxygen supply control unit 54 constituting the supply control unit 4 sets the supply rate of oxygen by the oxidizing agent supplying apparatus 30 in an early period of the time for starting to a supply rate at which oxygen remains in a gas after combustion based on the concentration of oxygen detected by the oxygen concentration sensor 52 before the start of supplying of oxygen by the oxidizing agent supplying apparatus 30. The early period of the time for starting as used herein refers to an early period of the time T1 for starting and is a period including at least the first supplying of oxygen by the oxidizing agent supplying apparatus 30 in the time T1 for starting and further, a period until a predetermined number of times of supplying of oxygen set in advance end, starting with at least the first supplying of oxygen by the oxidizing agent supplying apparatus 30 in the time T1 for starting.

The working gas circulation engine 201 includes, as described above, the oxidizing agent supplying apparatus 30 and the fuel supplying apparatus 40 in the supplying apparatus 2. The oxidizing agent supplying apparatus 30 supplies oxygen as a reactant into the combustion chamber CC by supplying oxygen to the circulation path 20. That is, the oxidizing agent supplying apparatus 30 supplies oxygen into the combustion chamber CC by the oxygen being injected into the suction port 11b by the oxidizing agent injection means 32 before being mixed with a working gas from the suction port 11b. The fuel supplying apparatus 40 directly supplies hydrogen as the reactant subjected to combustion by the oxygen into the combustion chamber CC. That is the fuel supplying apparatus 40 directly supplies hydrogen into the combustion chamber CC by the hydrogen being injected into the combustion chamber CC by the fuel injection means 42.

In the working gas circulation engine 201, hydrogen directly supplied into the combustion chamber CC by the fuel supplying apparatus 40 is all hydrogen supplied from the fuel supplying apparatus 40 that is supplied into the combustion chamber CC always without delay even in the early period of the time for starting. On the other hand, oxygen supplied into the combustion chamber CC after being injected to the outside of the combustion chamber CC, that is, into the suction port 11b on the opposite side of the combustion chamber CC sandwiching the suction valve 15 tends to be harder to be sucked into the combustion chamber CC in the early period of the time for starting because no oxygen is supplied by the last cycle in the first suction stroke from the stopped state of the working gas circulation engine 201, the suction quantity that can be sucked into the combustion chamber CC by one suction stroke is limited, and the opening/closing timing of the suction valve 15 also has an influence and thus, all oxygen supplied into the suction port 11b from the oxidizing agent supplying apparatus 30 may not necessarily be sucked into the combustion chamber CC. That is, in the working gas circulation engine 201, the supply rate of oxygen actually supplied into the combustion chamber CC is insufficient with respect to the supply rate of hydrogen into the combustion chamber CC to generate proper starting torque required for starting in the early period of the time for starting because a portion of oxygen supplied into the suction port 11b from the oxidizing agent supplying apparatus 30 remains in the suction port 11b, that is, the supply rate of oxygen actually supplied into the combustion chamber CC is insufficient with respect to the supply rate of oxygen necessary to subject all hydrogen supplied into the combustion chamber CC to combustion and, as a result, there is a possibility that starting is not smooth due to insufficient torque actually generated with respect to proper starting torque required for starting or hydrogen not subjected to combustion is accumulated in the circulation path 20.

Thus, in the working gas circulation engine 201 in the present embodiment, as described above, the oxygen supply control unit 54 constituting the supply control unit 4 sets the supply rate of oxygen by the oxidizing agent supplying apparatus 30 in the early period of the time for starting to a supply rate at which oxygen remains in a gas after combustion of hydrogen and oxygen to prevent torque actually generated from being insufficient with respect to proper starting torque required for starting to realize proper starting and also to prevent hydrogen not subjected to combustion from being accumulated in the circulation path 20.

That is, the working gas circulation engine 201 can supply a sufficient amount of oxygen to subject all hydrogen to combustion by increasing the supply rate of oxygen supplied from the oxidizing agent supplying apparatus 30 into the suction port 11b in the early period of the time for starting to over a theoretical rate for the supply rate of hydrogen into the combustion chamber CC even if it is hard for oxygen to be sucked into the combustion chamber CC in the early period of the time for starting and a portion of oxygen supplied into the suction port 11b from the oxidizing agent supplying apparatus 30 remains in the suction port 11b so that all oxygen is not sucked into the combustion chamber CC. As a result, even if it is hard for oxygen to be sucked into the combustion chamber CC in the early period of the time for starting and a portion of oxygen supplied into the suction port 11b from the oxidizing agent supplying apparatus 30 remains in the suction port 11b so that all oxygen is not sucked into the combustion chamber CC, the working gas circulation engine 201 can reliably prevent oxygen necessary for subjecting all hydrogen supplied into the combustion chamber CC from being insufficient and reliably prevent torque actually generated from being insufficient with respect to proper starting torque required for starting by supplying a sufficient amount of oxygen into the combustion chamber CC to subject all hydrogen supplied into the combustion chamber CC so that proper starting can be assured and also hydrogen not subjected to combustion can be prevented from being accumulated in the circulation path 20.

At this point, if the working gas circulation engine 201 increases the supply rate of oxygen supplied from the oxidizing agent supplying apparatus 30 into the suction port 11b in the early period of the time for starting to over a theoretical rate for the supply rate of hydrogen into the combustion chamber CC too much, the ratio of argon inside the combustion chamber CC may decrease depending on, for example, the residual state of oxygen inside the circulation path 20 after the last stop of the working gas circulation engine 1 described above, leading to insufficient torque actually generated with respect to proper starting torque required for starting.

Thus, in the working gas circulation engine 201 in the present embodiment, the oxygen supply control unit 54 constituting the supply control unit 4 further sets the supply rate of oxygen by the oxidizing agent supplying apparatus 30 in the early period of the time for starting to a supply rate at which oxygen remains in a gas after combustion based on the concentration of oxygen detected by the oxygen concentration sensor 52 before the start of supplying of oxygen by the oxidizing agent supplying apparatus 30. In other words, the oxygen supply control unit 54 in the present embodiment increases and sets the supply rate of oxygen by the oxidizing agent supplying apparatus 30 in the early period of the time for starting to a supply rate at which oxygen remains in a gas after combustion of hydrogen and oxygen and, at this point, corrects the supply rate of oxygen by the oxidizing agent supplying apparatus 30 in the early period of the time for starting based on the concentration of oxygen detected by the oxygen concentration sensor 52 before the start of supplying of oxygen by the oxidizing agent supplying apparatus 30.

As a result, even if it is hard for oxygen to be sucked into the combustion chamber CC in the early period of the time for starting and a portion of oxygen supplied into the suction port 11b from the oxidizing agent supplying apparatus 30 remains in the suction port 11b so that all oxygen is not sucked into the combustion chamber CC, the working gas circulation engine 201 can adjust the ratio of the reactant to the working gas in the combustion chamber CC to a proper ratio that can provide proper starting torque required for starting regardless of the residual state of reactant inside the circulation path 20 after the last stop of the working gas circulation engine 1 by the supply rate of oxygen by the oxidizing agent supplying apparatus 30 in the early period of the time for starting being set to a supply rate at which oxygen remains in a gas after combustion by the oxygen supply control unit 54 based on the concentration of oxygen detected by the oxygen concentration sensor 52 before the start of supplying of oxygen by the oxidizing agent supplying apparatus 30 so that proper starting can be assured.

The oxygen/hydrogen supplying control in the time for starting the working gas circulation engine 201 according to the present embodiment will now be described more specifically with reference to the flow chart in FIG. 7. The oxygen/hydrogen supplying control in the time for starting is control exercised by the starting control of the working gas circulation engine 201 and is basically exercised between the starting start point t1 and the starting end point t4. A control routine thereof is repeatedly executed in a control period of several milliseconds to several tens milliseconds.

First, the starting status judging unit 56 of the electronic control unit 50 acquires the engine speed of the working gas circulation engine 201 based on a detection signal of the crank angle sensor 51 and judges whether the working gas circulation engine 201 is in the time for starting based on the acquired engine speed (S300).

If the starting status judging unit 56 judges that the working gas circulation engine 201 is not in the time for starting (S300: No), that is, the working gas circulation engine 201 is after starting, the electronic control unit 50 terminates the current control period to move to the next one and also exercises, for example, normal oxygen/hydrogen supplying control.

If the starting status judging unit 56 judges that the working gas circulation engine 201 is in the time for starting (S300: Yes), the hydrogen supply control unit 55 calculates a starting basic hydrogen supply rate a (S301). The starting basic hydrogen supply rate a is a basic supply rate of hydrogen supplied into the combustion chamber CC in the time for starting and is preset in accordance with the quantity of hydrogen in accordance with the quantity of heat necessary for the time for starting (the quantity of hydrogen enabling to provide proper starting torque required for starting), the engine warming state such as the engine water temperature, and environmental conditions. The hydrogen supply control unit 55 calculates the starting basic hydrogen supply rate a from the quantity of hydrogen in accordance with the quantity of heat necessary for starting, the engine warming state such as the engine water temperature, environmental conditions and the like based on, for example, a starting basic hydrogen supply rate map (not illustrated) showing the relationship between the starting basic hydrogen supply rate a and the quantity of hydrogen in accordance with the quantity of heat necessary for starting, the engine warming state such as the engine water temperature, environmental conditions.

Next, the starting status judging unit 56 judges whether the present time is before supplying of oxygen and hydrogen by the oxidizing agent supplying apparatus 30 and the fuel supplying apparatus 40 respectively (before the first supplying of oxygen and hydrogen) is started (S302).

If the starting status judging unit 56 judges that the present time is before supplying of oxygen and hydrogen by the oxidizing agent supplying apparatus 30 and the fuel supplying apparatus 40 is started (S302: Yes), the hydrogen supply control unit 55 acquires the concentration of hydrogen detected by the hydrogen concentration sensor 53 (the concentration of hydrogen inside the circulation path 20 before the start of supplying of hydrogen by the fuel supplying apparatus 40) and the oxygen supply control unit 54 acquires the concentration of oxygen detected by the oxygen concentration sensor 52 (the concentration of oxygen inside the circulation path 20 before the start of supplying of oxygen by the oxidizing agent supplying apparatus 30) (S303).

Next, the oxygen supply control unit 54 calculates a starting basic oxygen supply rate A based on the starting basic hydrogen supply rate a calculated at S301 (S304). The starting basic oxygen supply rate A is a basic supply rate of oxygen supplied into the combustion chamber CC in the time for starting and is a supply rate in accordance with a theoretical ratio corresponding to the starting basic hydrogen supply rate a, that is, the supply rate of quantity of oxygen that subjects all hydrogen of the starting basic hydrogen supply rate a to combustion and also leaves no oxygen in an exhaust gas after combustion. The oxygen supply control unit 54 calculates, for example, ½ of the starting basic hydrogen supply rate a as the starting basic oxygen supply rate A in a mol ratio.

Next, the hydrogen supply control unit 55 corrects the starting basic hydrogen supply rate a calculated at S301 based on the concentration of hydrogen inside the circulation path 20 acquired at S303 before the start of supplying of hydrogen by the fuel supplying apparatus 40 to calculate a starting correction hydrogen supply rate a' and the oxygen supply control unit 54 corrects the starting basic oxygen supply rate A calculated at S304 based on the concentration of oxygen inside the circulation path 20 acquired at S303 before the start of supplying of oxygen by the oxidizing agent supplying apparatus 30 to calculate a starting correction oxygen supply rate A' (S305). The hydrogen supply control unit 55 corrects the starting basic hydrogen supply rate a by relatively increasing a decrement for the starting basic hydrogen supply rate a with a relatively increasing concentration of hydrogen acquired at S303, that is, a relatively increasing concentration of hydrogen remaining inside the circulation path 20 and corrects the starting basic hydrogen supply rate a by relatively decreasing a decrement for the starting basic hydrogen supply rate a with a relatively decreasing concentration of hydrogen acquired at S303, that is, a relatively decreasing concentration of hydrogen remaining inside the circulation path 20 to calculate the starting correction hydrogen supply rate a'. In other words, the starting correction hydrogen supply rate a' is a quantity of hydrogen obtained by subtracting a quantity of hydrogen remaining inside the circulation path 20 in accordance with the concentration of hydrogen from the starting basic hydrogen supply rate a, which is the quantity of hydrogen in accordance with the quantity of heat necessary for starting (the quantity of hydrogen enabling to provide proper starting torque required for starting). The oxygen supply control unit 54 corrects the starting basic oxygen supply rate A by relatively increasing a decrement for the starting basic oxygen supply rate A with a relatively increasing concentration of oxygen acquired at S303, that is, a relatively increasing concentration of oxygen remaining inside the circulation path 20 and corrects the starting basic oxygen supply rate A by relatively decreasing a decrement for the starting basic oxygen supply rate A with a relatively decreasing concentration of oxygen acquired at S303, that is, a relatively decreasing concentration of oxygen remaining inside the circulation path 20 to calculate the starting correction oxygen supply rate A'. In other words, the starting correction oxygen supply rate A' is a quantity of oxygen obtained by subtracting a quantity of oxygen remaining inside the circulation path 20 in accordance with the concentration of oxygen from the starting basic oxygen supply rate A, which is the quantity of oxygen that subjects all hydrogen necessary for starting and also leaves no oxygen in an exhaust gas after combustion.

Next, the oxygen supply control unit 54 adds a starting increment B to the starting correction oxygen supply rate A' calculated at S305 and sets the sum of the starting correction oxygen supply rate A' and the starting increment B as a starting final oxygen supply rate C (S306). The starting increment B is a supply rate of oxygen for an incremental correction to subject all hydrogen in accordance with the quantity of heat necessary for starting even if it is hard for oxygen to be sucked into the combustion chamber CC in the early period of the time for starting and a portion of oxygen supplied into the suction port 11*b* from the oxidizing agent supplying apparatus 30 remains in the suction port 11*b* so that all oxygen is not sucked into the combustion chamber CC. The starting increment B is set to a quantity equal to or greater than the quantity of oxygen that could remain in the suction port 11*b* without being sucked into the combustion chamber CC in a suction stroke after being supplied from the oxidizing agent supplying apparatus 30 into the suction port 11*b*. The starting increment B may be preset based on an experiment in accordance with, for example, the injection tip position of the oxidizing agent injection means 32, volume of the suction port 11*b*, or degree of spitting from the combustion chamber CC. The starting final oxygen supply rate C is a supply rate of oxygen that is supplied by the oxidizing agent supplying apparatus 30 in the end.

Next, the oxygen supply control unit 54 judges whether the present time is the supplying timing of oxygen (S307).

If the oxygen supply control unit 54 judges that the present time is the supplying timing of oxygen (S307: Yes), the oxygen supply control unit 54 exercises control so that the supply rate of oxygen from the oxidizing agent supplying apparatus 30 becomes the starting final oxygen supply rate C by controlling driving of the oxidizing agent injection means 32 of the oxidizing agent supplying apparatus 30 and the injection quantity of oxygen from the oxidizing agent injection means 32 based on the starting final oxygen supply rate C, here the starting final oxygen supply rate C (=starting correction oxygen supply rate A'+starting increment B) set at S306 (S308). If the oxygen supply control unit 54 judges that the present time is not the supplying timing of oxygen (S307: No), the electronic control unit 50 skips this S308 to move to the next S309.

Next, the hydrogen supply control unit 55 judges whether the present time is the supplying timing of hydrogen (S309).

If the hydrogen supply control unit 55 judges that the present time is the supplying timing of hydrogen (S309: Yes), the hydrogen supply control unit 55 exercises control so that the supply rate of hydrogen from the fuel supplying apparatus 40 becomes the starting correction hydrogen supply rate a' by controlling driving of the fuel injection means 42 of the fuel supplying apparatus 40 and the injection quantity of hydrogen from the fuel injection means 42 based on the starting correction hydrogen supply rate a' calculated at S305 (S310) and the electronic control unit 50 terminates the current control period to move to the next one. If the hydrogen supply control unit 55 judges that the present time is not the supplying timing of hydrogen (S309: No), the electronic control unit 50 skips S310 to terminate the current control period before moving to the next one.

If the starting status judging unit 56 judges at S302 that the present time is after the start of supplying of oxygen and hydrogen by the oxidizing agent supplying apparatus 30 and the fuel supplying apparatus 40 (S302: No), the hydrogen supply control unit 55 acquires the concentration of hydrogen detected by the hydrogen concentration sensor 53 (the current concentration of hydrogen in the circulation path 20 after the start of supplying of hydrogen by the fuel supplying apparatus 40) and the oxygen supply control unit 54 acquires the concentration of oxygen detected by the oxygen concentration sensor 52 (the current concentration of oxygen in the circulation path 20 after the start of supplying of oxygen by the oxidizing agent supplying apparatus 30) (S311).

Next, the oxygen supply control unit 54 calculates the starting basic oxygen supply rate A based on the starting basic hydrogen supply rate a calculated at S301 (S312).

Next, the hydrogen supply control unit 55 corrects the starting basic hydrogen supply rate a calculated at S301 based on the current concentration of hydrogen in the circulation path 20 acquired at S311 after the start of supplying of hydrogen by the fuel supplying apparatus 40 to calculate the starting correction hydrogen supply rate a', and the oxygen supply control unit 54 corrects the starting basic oxygen supply rate A calculated at S312 based on the current concentration of oxygen in the circulation path 20 acquired at S311 after the start of supplying of oxygen by the oxidizing agent supplying apparatus 30 to calculate the starting correction oxygen supply rate A' (S313).

Next, the starting status judging unit 56 judges whether oxygen has been supplied to each cylinder by the oxidizing agent supplying apparatus 30 a predetermined number of times set in advance (S314). That is, the starting status judging unit 56 judges whether oxygen has been supplied a predetermined number of times set in advance, starting with the first supplying of oxygen by the oxidizing agent supplying apparatus 30 in the time T1 for starting.

If the starting status judging unit 56 judges that oxygen has not been supplied to each cylinder by the oxidizing agent supplying apparatus 30 a predetermined number of times set in advance (S314: No), that is, the present time is the first period of the time for starting, the electronic control unit 50 moves to the above S306 to perform processing below.

If the starting status judging unit 56 judges that oxygen has been supplied to each cylinder by the oxidizing agent supplying apparatus 30 a predetermined number of times set in advance (S314: Yes), that is, the present time is the time for starting, but is not the first period of the time for starting, the oxygen supply control unit 54 sets the starting correction oxygen supply rate A' set at S313 as the starting final oxygen supply rate C (S315) and the electronic control unit 50 moves to the above S307 to perform processing below. In this case, the oxygen supply control unit 54 exercises control so that the supply rate of oxygen from the oxidizing agent supplying apparatus 30 becomes the starting final oxygen supply rate C by controlling driving of the oxidizing agent injection means 32 of the oxidizing agent supplying apparatus 30 and the injection quantity of oxygen from the oxidizing agent injection means 32 based on the starting final oxygen supply rate C, here the starting final oxygen supply rate C set at S315 (=starting correction oxygen supply rate A').

According to the working gas circulation engine 201 in the above embodiment of the present invention, the working gas circulation engine 201 can supply reactants (oxygen, hydrogen) into the combustion chamber CC in proper quantities with respect to the supply rates of the reactants normally needed for starting regardless of the residual state of reactants inside the circulation path 20 after the last stop of the working gas circulation engine 201 by at least the initial supply rates of reactants by the supplying apparatus 2 being controlled by the supply control unit 4 in the time T1 for starting based on the concentrations of reactants detected by the reactant concentration sensor 3 before the start of supplying of the reactants by the supplying apparatus 2 and adjust the ratio of the reactants to a working gas inside the combustion chamber CC to a proper ratio capable of providing proper starting torque required for starting in the time for starting so that proper starting can be assured.

Further, according to the working gas circulation engine 201 in the above embodiment of the present invention, the supplying apparatus 2 includes the oxidizing agent supplying apparatus 30 that supplies oxygen as a reactant to the circulation path 20 to supply the oxygen into the combustion chamber CC and the fuel supplying apparatus 40 that supplies hydrogen as a reactant subjected to combustion by oxygen directly into the combustion chamber CC and the oxygen supply control unit 54 constituting the supply control unit 4 sets the supply rate of oxygen by the oxidizing agent supplying apparatus 30 in the early period of the time for starting to a supply rate at which oxygen remains in a gas after combustion based on the concentration of oxygen detected by the oxygen concentration sensor 52 constituting the reactant concentration sensor 3 before the start of supplying of oxygen by the oxidizing agent supplying apparatus 30. Therefore, even if it is hard for oxygen to be sucked into the combustion chamber CC in the early period of the time for starting and a portion of oxygen supplied into the suction port 11b from the oxidizing agent supplying apparatus 30 remains in the suction port 11b so that all oxygen is not sucked into the combustion chamber CC, the working gas circulation engine 201 can adjust the ratio of the reactant to the working gas in the combustion chamber CC to a proper ratio that can provide proper starting torque required for starting regardless of the residual state of reactants inside the circulation path 20 after the last stop of the working gas circulation engine 1 by the supply rate of oxygen by the oxidizing agent supplying apparatus 30 in the early period of the time for starting being set to a supply rate at which oxygen remains in a gas after combustion based on the concentration of oxygen detected by the oxygen concentration sensor 52 constituting the reactant concentration sensor 3 before the start of supplying of oxygen by the oxidizing agent supplying apparatus 30 so that proper starting can further be assured.

In the above description, it is assumed that the oxygen supply control unit 54 constituting the supply control unit 4 as supply control means corrects the starting basic oxygen supply rate A based on the concentration of oxygen inside the circulation path 20 before the start of supplying of oxygen by the oxidizing agent supplying apparatus 30 and calculates the starting final oxygen supply rate C by adding the starting increment B to the corrected starting correction oxygen supply rate A', but the present invention is not limited to this. After the starting increment B being added to the starting basic oxygen supply rate A, the oxygen supply control unit 54 may change, that is, correct, the added value of the starting basic oxygen supply rate A and the starting increment B based on the concentration of oxygen inside the circulation path 20 before the start of supplying of oxygen by the oxidizing agent supplying apparatus 30 to calculate the starting final oxygen supply rate C or after the starting increment B being changed, that is, corrected based on the concentration of oxygen inside the circulation path 20 before the start of supplying of oxygen by the oxidizing agent supplying apparatus 30, the oxygen supply control unit 54 may the starting basic oxygen supply rate A and the corrected starting increment B to calculate the starting final oxygen supply rate C.

(Third Embodiment)

Figure 8:
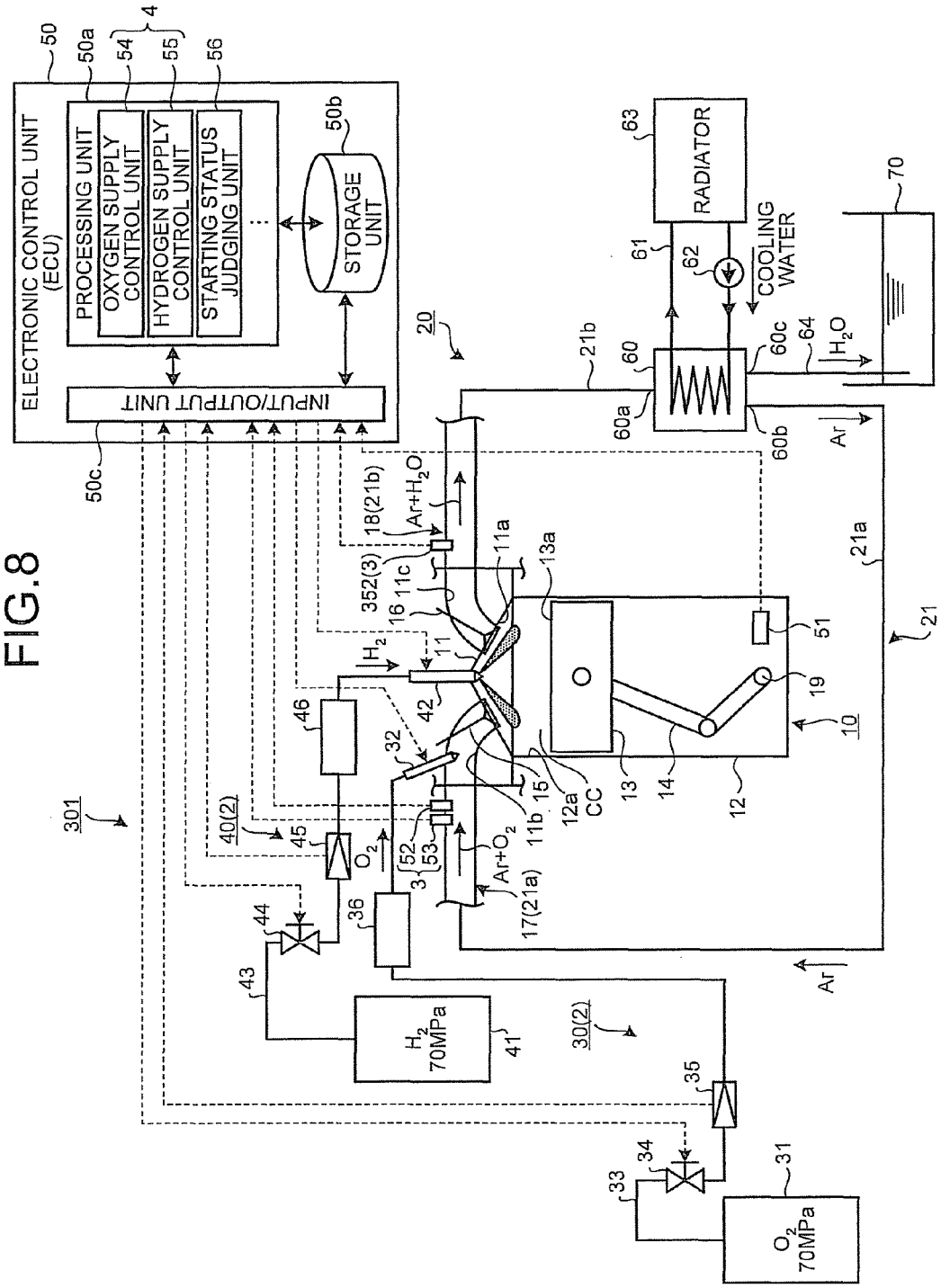
FIG. 8 is a schematic diagram of a working gas circulation engine according to a third embodiment of the present invention.
Figure 9:
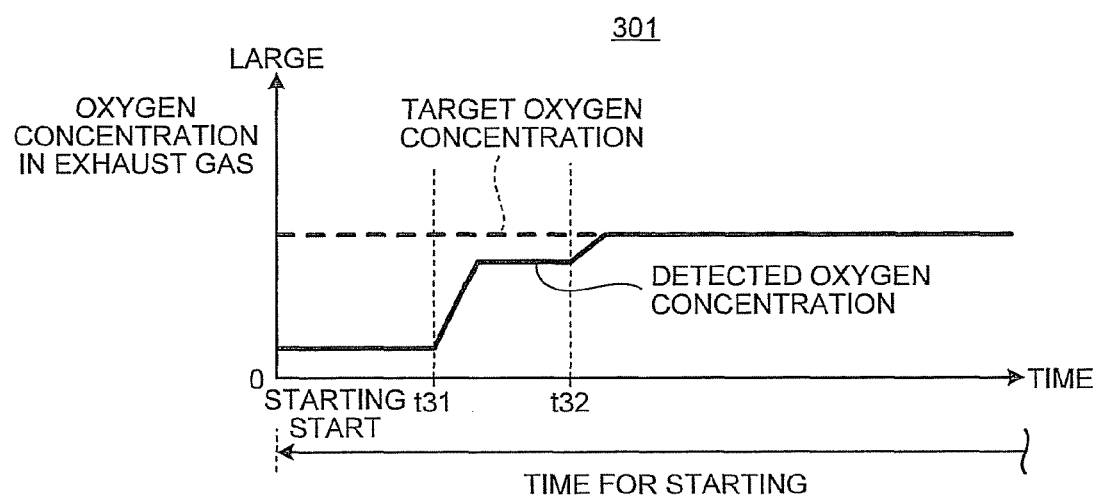
FIG. 9 is a time chart explaining one example of the oxygen/hydrogen supplying control when the working gas circulation engine according to the third embodiment of the present invention is started.
Figure 10:
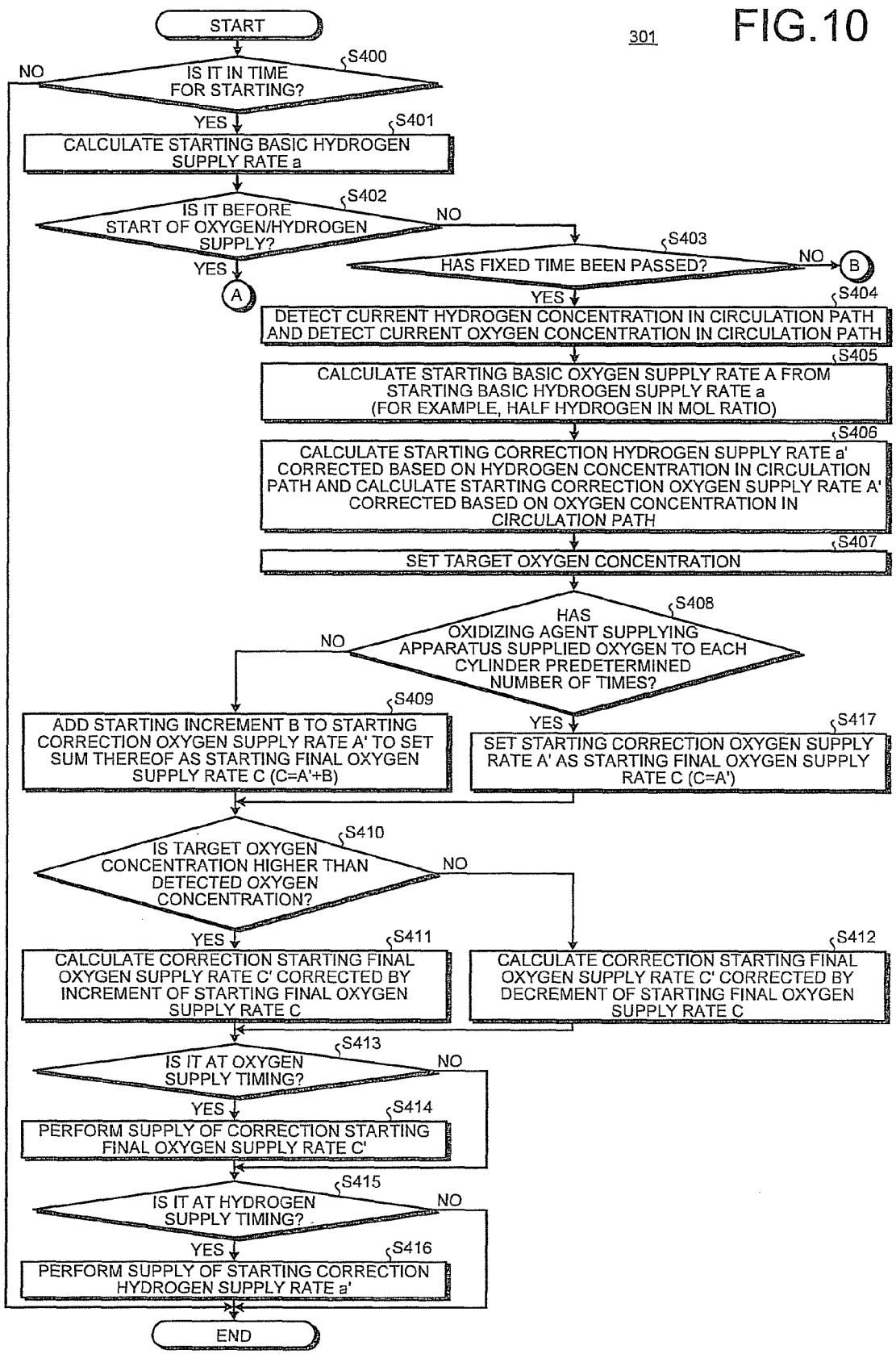
FIG. 10 is a flow chart explaining the oxygen/hydrogen supplying control when the working gas circulation engine according to the third embodiment of the present invention is started.

FIG. 8 is a schematic diagram of a working gas circulation engine according to a third embodiment of the present invention; FIG. 9 is a time chart exemplifying oxygen/hydrogen supplying control when the working gas circulation engine according to the third embodiment of the present invention is started; and FIG. 10 is a flow chart explaining the oxygen/hydrogen supplying control when the working gas circulation engine according to the third embodiment of the present invention is started. The working gas circulation engine according to the third embodiment has substantially the same configuration as that of the working gas circulation engine according to the second embodiment, but is different therefrom in that the supply rate of oxygen by the oxygen supply means after the start of supplying of oxygen in the time for starting is set based on the concentration of oxygen in a gas after combustion detected by the concentration detection means after the start of supplying of oxygen. In addition, the same description will not be repeated if possible regarding components, operations, and effects that are common to those of the above embodiments and the same reference numerals are attached.

In a working gas circulation engine 301 in the present embodiment, the oxygen supply control unit 54 constituting the supply control unit 4 sets the supply rate of oxygen by the oxidizing agent supplying apparatus 30 after the start of supplying of oxygen in the time for starting based on the concentration of oxygen in a gas after combustion detected by the reactant concentration sensor 3 after the start of supplying of oxygen.

The working gas circulation engine 301 according to the third embodiment includes, as illustrated in FIG. 8, an oxygen concentration sensor 352 separately from the oxygen concentration sensor 52 as the reactant concentration sensor 3. The oxygen concentration sensor 352 detects the concentration of oxygen, which is a reactant in a circulating gas circulating through the circulation path 20. Further, the oxygen concentration sensor 352 is provided on the exhaust side of the combustion chamber CC to detect the concentration of oxygen in an exhaust gas from the combustion chamber CC. The oxygen concentration sensor 352 detects, for example, the concentration of oxygen in an exhaust gas after combustion of oxygen and hydrogen in the combustion chamber CC. The oxygen concentration sensor 352 is provided in the circulation path 20 and here, near the exhaust port 11c. Accordingly, the oxygen concentration sensor 352 can detect the concentration of oxygen in an exhaust gas immediately after the exhaust gas being discharged from the combustion chamber CC to the exhaust port 11c. The oxygen concentration sensor 352 transmits a detection signal to the electronic control unit 50.

In the working gas circulation engine 301 according to the present embodiment, as illustrated in FIG. 8, it is assumed that the oxygen concentration sensor 52 and the oxygen concentration sensor 352 are provided separately and while the oxygen concentration sensor 52 detects the concentration of oxygen in a gas near the suction port 11b, the oxygen concentration sensor 352 detects the concentration of oxygen in a gas near the exhaust port 11c, but the present invention is not limited to this. If, for example, the length of the circulation path 20 is short, that is, the suction port 11b and the exhaust port 11c connected via the circulating passage 21 are close to each other, as illustrated in FIG. 1, the working gas circulation engine 301 according to the present embodiment may also use the oxygen concentration sensor 52 in place of the oxygen concentration sensor 352 or the oxygen concentration sensor 352 in place of the oxygen concentration sensor 52.

Then, as described above, the oxygen supply control unit 54 sets the supply rate of oxygen by the oxidizing agent supplying apparatus 30 after the start of supplying of oxygen in the time for starting based on the concentration of oxygen in a gas after combustion detected by the oxygen concentration sensor 52 after the start of supplying of oxygen. That is, the oxygen supply control unit 54 corrects the supply rate of oxygen by the oxidizing agent supplying apparatus 30 after the start of supplying of oxygen in the time for starting based on the concentration of oxygen in an exhaust gas after combustion of oxygen and hydrogen.

Further, the oxygen supply control unit 54 controls the supply rate of oxygen by the oxidizing agent supplying apparatus 30 so that the detected concentration of oxygen detected by the oxygen concentration sensor 352 becomes a target concentration of oxygen. The detected concentration of oxygen is the concentration of oxygen in an exhaust gas after combustion of oxygen and hydrogen detected by the oxygen concentration sensor 352 after the start of supplying of oxygen and hydrogen by the oxidizing agent supplying apparatus 30 and the fuel supplying apparatus 40 respectively (after the first supplying of oxygen and hydrogen). The target concentration of oxygen is the concentration of oxygen targeted for control and here, a predetermined concentration of oxygen that makes an exhaust gas after combustion of oxygen and hydrogen in the combustion chamber CC oxygen-rich. In other words, the oxygen supply control unit 54 exercises feedback control of the supply rate of oxygen by the oxidizing agent supplying apparatus 30 based on the target concentration of oxygen and the detected concentration of oxygen to obtain proper starting torque required for starting.

For example, the working gas circulation engine 301 according to the present embodiment sets, as described in the second embodiment, the supply rate of oxygen by the oxidizing agent supplying apparatus 30 in the early period of the time for starting to a supply rate at which oxygen remains in a gas after combustion. In this case, the oxygen supply control unit 54 in the present embodiment controls the supply rate of oxygen by the oxidizing agent supplying apparatus 30 so that the detected concentration of oxygen detected by the oxygen concentration sensor 352 becomes the target concentration of oxygen by setting an incremental quantity of oxygen that should remain in a gas after combustion with respect to the quantity of oxygen in a theoretical ratio in accordance with the supply rate of hydrogen, that is, the concentration of oxygen that should remain in an exhaust gas in accordance with the starting increment B to the target concentration of oxygen.

In the time chart exemplified in FIG. 9, for example, if the detected concentration of oxygen in an exhaust gas after combustion of oxygen supplied from the oxidizing agent supplying apparatus 30 and hydrogen is smaller than the target concentration of oxygen at a point t31 in the time for starting, the oxygen supply control unit 54 sets the supply rate of oxygen by the oxidizing agent supplying apparatus 30 at the next point to a supply rate obtained by correcting the supply rate of oxygen by the oxidizing agent supplying apparatus 30 at the point t31 by a predetermined increment. Then, the oxygen supply control unit 54 controls the supply rate of oxygen from the oxidizing agent supplying apparatus 30 at the point t32 by controlling driving of the oxidizing agent injection means 32 and the injection quantity of oxygen from the oxidizing agent injection means 32 based on the supply rate corrected by the increment. Conversely, if the detected concentration of oxygen in an exhaust gas after combustion of oxygen and hydrogen is larger than the target concentration of oxygen, the oxygen supply control unit 54 sets the supply rate of oxygen by the oxidizing agent supplying apparatus 30 at the next point to a supply rate obtained by correcting the current supply rate of oxygen by the oxidizing agent supplying apparatus 30 by a predetermined decrement. Thus, the oxygen supply control unit 54 controls the supply rate of oxygen by the oxidizing agent supplying apparatus 30 so that the detected target concentration of oxygen converges to the target concentration of oxygen.

As a result, the oxygen supply control unit 54 constituting the supply control unit 4 sets the supply rate of oxygen by the oxidizing agent supplying apparatus 30 after the start of supplying of oxygen in the time for starting based on the concentration of oxygen in a gas after combustion detected by the reactant concentration sensor 3 after the start of supplying of oxygen, the working gas circulation engine 301 can properly deal with uncertain fluctuations such as disturbances and design errors in oxygen supply control in the time for starting, resulting in improved robustness. Thus, the working gas circulation engine 301 can always adjust the ratio of oxygen to the working gas in the combustion chamber CC to a proper ratio capable of providing proper starting torque required for starting in the time for starting and therefore, smooth increasing engine speed in the time for starting and stabilization of the engine speed can reliably be realized so that starting qualities can further be improved.

Next, the oxygen/hydrogen supplying control in the time for starting the working gas circulation engine 301 according to the present embodiment will be described more concretely with reference to the flow chart in FIG. 10. The oxygen/hydrogen supplying control in the time for starting is control exercised by the starting control of the working gas circulation engine 301 and is basically exercised between the starting start point t1 and the starting end point t4. A control routine thereof is repeatedly executed in a control period of several milliseconds to several tens milliseconds.

First, the starting status judging unit 56 of the electronic control unit 50 acquires the engine speed of the working gas circulation engine 301 based on a detection signal of the crank angle sensor 51 and judges whether the working gas circulation engine 301 is in the time for starting based on the acquired engine speed (S400).

If the starting status judging unit 56 judges that the working gas circulation engine 301 is not in the time for starting (S400: No), that is, the working gas circulation engine 301 is after starting, the electronic control unit 50 terminates the current control period to move to the next one and also exercises, for example, normal oxygen/hydrogen supplying control.

If the starting status judging unit 56 judges that the working gas circulation engine 301 is in the time for starting (S400: Yes), the hydrogen supply control unit 55 calculates the starting basic hydrogen supply rate a (S401).

Next, the starting status judging unit 56 judges whether the present time is before supplying of oxygen and hydrogen by the oxidizing agent supplying apparatus 30 and the fuel supplying apparatus 40 respectively (before the first supplying of oxygen and hydrogen) is started (S402).

If the starting status judging unit 56 judges that the present time is before supplying of oxygen and hydrogen by the oxidizing agent supplying apparatus 30 and the fuel supplying apparatus 40 is started (S402: Yes), the electronic control unit 50 moves to S303 (see FIG. 7) described with reference to FIG. 7 to perform subsequent processing. The detailed description thereof will not be repeated.

If the starting status judging unit 56 judges that the present time is after supplying of oxygen and hydrogen by the oxidizing agent supplying apparatus 30 and the fuel supplying apparatus 40 is started (S402: No), the starting status judging unit 56 judges whether a fixed time set in advance has passed from the start point of supplying of oxygen and hydrogen by the oxidizing agent supplying apparatus 30 and the fuel supplying apparatus 40 (S403). The fixed time is a time corresponding the time from the point in time when supplying of oxygen and hydrogen by the oxidizing agent supplying apparatus 30 and the fuel supplying apparatus 40 is started until the supplied oxygen and hydrogen are subjected to combustion in the combustion chamber CC, an exhaust gas after the combustion reaches the oxygen concentration sensor 352, and the concentration of oxygen in the exhaust gas becomes detectable and is preset in accordance with the concentration detection position of the oxygen concentration sensor 352 in the circulation path 20.

If the starting status judging unit 56 judges that a fixed time set in advance has not passed from the start point of supplying of oxygen and hydrogen by the oxidizing agent supplying apparatus 30 and the fuel supplying apparatus 40 (S403: No), the electronic control unit 50 moves to S311 (see FIG. 7) described with reference to FIG. 7 to perform subsequent processing. The detailed description thereof will not be repeated.

If the starting status judging unit 56 judges that a fixed time set in advance has passed from the start point of supplying of oxygen and hydrogen by the oxidizing agent supplying apparatus 30 and the fuel supplying apparatus 40 (S403: Yes), the hydrogen supply control unit 55 acquires the concentration of hydrogen detected by the hydrogen concentration sensor 53 (the current concentration of hydrogen inside the circulation path 20 after the start of supplying of hydrogen by the fuel supplying apparatus 40) and the oxygen supply control unit 54 acquires the concentrations of oxygen detected by the oxygen concentration sensor 52 and the oxygen concentration sensor 352 (the current concentration of oxygen inside the circulation path 20 after the start of supplying of oxygen by the oxidizing agent supplying apparatus 30) (S404).

Next, the oxygen supply control unit 54 calculates the starting basic oxygen supply rate A based on the starting basic hydrogen supply rate a calculated at S401 (S405).

Next, the hydrogen supply control unit 55 corrects the starting basic hydrogen supply rate a calculated at S401 based on the current concentration of hydrogen inside the circulation path 20 acquired at S404 after the start of supplying of hydrogen by the fuel supplying apparatus 40 to calculate the starting correction hydrogen supply rate a' and the oxygen supply control unit 54 corrects the starting basic oxygen supply rate A calculated at S405 based on the concentration of oxygen inside the circulation path 20 acquired at S404 after the start of supplying of oxygen by the oxidizing agent supplying apparatus 30, here the concentration of oxygen detected by the oxygen concentration sensor 52 to calculate the starting correction oxygen supply rate A' (S406).

Next, the oxygen supply control unit 54 sets a target concentration of oxygen (S407). The oxygen supply control unit 54 sets, for example, an incremental quantity of oxygen that should remain in a gas after combustion with respect to the quantity of oxygen in a theoretical ratio in accordance with the supply rate of hydrogen, that is, the concentration of oxygen that should remain in an exhaust gas in accordance with the starting increment B as the target concentration of oxygen.

Next, the starting status judging unit 56 judges whether oxygen has been supplied to each cylinder by the oxidizing agent supplying apparatus 30 a predetermined number of times set in advance (S408).

If the starting status judging unit 56 judges that oxygen has not been supplied to each cylinder by the oxidizing agent supplying apparatus 30 a predetermined number of times set in advance (S408: No), that is, the present time is the first period of the time for starting, the oxygen supply control unit 54 adds the starting increment B to the starting correction oxygen supply rate A' calculated at S406 and sets the sum of the starting correction oxygen supply rate A' and the starting increment B as the starting final oxygen supply rate C (S409).

Next, the oxygen supply control unit 54 compares the current concentration of oxygen inside the circulation path 20 acquired at S404 after the start of supplying of oxygen by the oxidizing agent supplying apparatus 30, here the detected concentration of oxygen that is a concentration of oxygen detected by the oxygen concentration sensor 352 and the target concentration of oxygen set at S407 to judge whether the detected concentration of oxygen is smaller than the target concentration of oxygen (S410).

If the oxygen supply control unit 54 judges that the detected concentration of oxygen is smaller than the target concentration of oxygen (S410: Yes), the oxygen supply control unit 54 calculates a correction starting final oxygen supply rate C' obtained by correcting the starting final oxygen supply rate C set at S409 by a predetermined increment (S411). On the other hand, if the oxygen supply control unit 54 judges that the detected concentration of oxygen is equal to or larger than the target concentration of oxygen (S410: No), the oxygen supply control unit 54 calculates a correction starting final oxygen supply rate C' obtained by correcting the starting final oxygen supply rate C set at S409 by a predetermined decrement (S412).

Next, the oxygen supply control unit 54 judges whether the present time is the supplying timing of oxygen (S413).

If the oxygen supply control unit 54 judges that the present time is the supplying timing of oxygen (S413: Yes), the oxygen supply control unit 54 exercises control so that the supply rate of oxygen from the oxidizing agent supplying apparatus 30 becomes the correction starting final oxygen supply rate C' by controlling driving of the oxidizing agent injection means 32 of the oxidizing agent supplying apparatus 30 and the injection quantity of oxygen from the oxidizing agent injection means 32 based on the correction starting final oxygen supply rate C' calculated at S411 or S412 (S414). If the oxygen supply control unit 54 judges that the present time is not the supplying timing of oxygen (S413: No), the electronic control unit 50 skips this S414 to move to the next S415.

Next, the hydrogen supply control unit 55 judges whether the present time is the supplying timing of hydrogen (S415).

If the hydrogen supply control unit 55 judges that the present time is the supplying timing of hydrogen (S415: Yes), the hydrogen supply control unit 55 exercises control so that the supply rate of hydrogen from the fuel supplying apparatus 40 becomes the starting correction hydrogen supply rate a' by controlling driving of the fuel injection means 42 of the fuel supplying apparatus 40 and the injection quantity of hydrogen from the fuel injection means 42 based on the starting correction hydrogen supply rate a' calculated at S406 (S416) and the electronic control unit 50 terminates the current control period to move to the next one. If the hydrogen supply control unit 55 judges that the present time is not the supplying timing of hydrogen (S415: No), the electronic control unit 50 skips S416 to terminate the current control period before moving to the next one.

If the starting status judging unit 56 judges that oxygen has been supplied to each cylinder by the oxidizing agent supplying apparatus 30 a predetermined number of times set in advance at S408 (S408: Yes), that is, the present time is the time for starting, but is not the first period of the time for starting, the oxygen supply control unit 54 sets the starting correction oxygen supply rate A' set at S406 as the starting final oxygen supply rate C (S417) and the electronic control unit 50 moves to the above S410 to repeatedly perform processing below. In this case, the oxygen supply control unit 54 calculates at S411 the correction starting final oxygen supply rate C' obtained by correcting the starting final oxygen supply rate C set at S417 by a predetermined increment and at S412 the correction starting final oxygen supply rate C' obtained by correcting the starting final oxygen supply rate C set at S417 by a predetermined decrement.

According to the working gas circulation engine 301 in the above embodiment of the present invention, the working gas circulation engine 301 can supply reactants (oxygen, hydrogen) into the combustion chamber CC in proper quantities with respect to the supply rates of the reactants normally needed for starting regardless of the residual state of reactants inside the circulation path 20 after the last stop of the working gas circulation engine 301 by at least the initial supply rates of reactants by the supplying apparatus 2 being controlled by the supply control unit 4 in the time T1 for starting based on the concentrations of reactants detected by the reactant concentration sensor 3 before supplying of the reactants by the supplying apparatus 2 is started and adjust the ratio of the reactants to a working gas inside the combustion chamber CC to a proper ratio capable of providing proper starting torque required for starting in the time for starting so that proper starting can be assured.

Further, according to the working gas circulation engine 301 in the above embodiment of the present invention, the supplying apparatus 2 includes the oxidizing agent supplying apparatus 30 that supplies oxygen as a reactant and the fuel supplying apparatus 40 that supplies hydrogen as a reactant subjected to combustion by oxygen and the oxygen supply control unit 54 constituting the supply control unit 4 sets the supply rate of oxygen by the oxidizing agent supplying apparatus 30 after the start of supplying of oxygen in the time for starting based on the concentration of oxygen in a gas after combustion detected by the oxygen concentration sensor 352 constituting the reactant concentration sensor 3 after the start of supplying of oxygen. Therefore, the working gas circulation engine 301 can always adjust the ratio of oxygen to the working gas inside the combustion chamber CC to a proper ratio capable of providing proper starting torque required for starting in the time for starting by the supply rate of oxygen by the oxidizing agent supplying apparatus 30 after the start of supplying of oxygen in the time for starting being set to the concentration of oxygen in a gas after combustion detected by the reactant concentration sensor 3 after the start of supplying of oxygen so that smooth increasing engine speed in the time for starting and stabilization of the engine speed can reliably be realized and starting qualities can further be improved.

(Fourth Embodiment)

Figure 11:
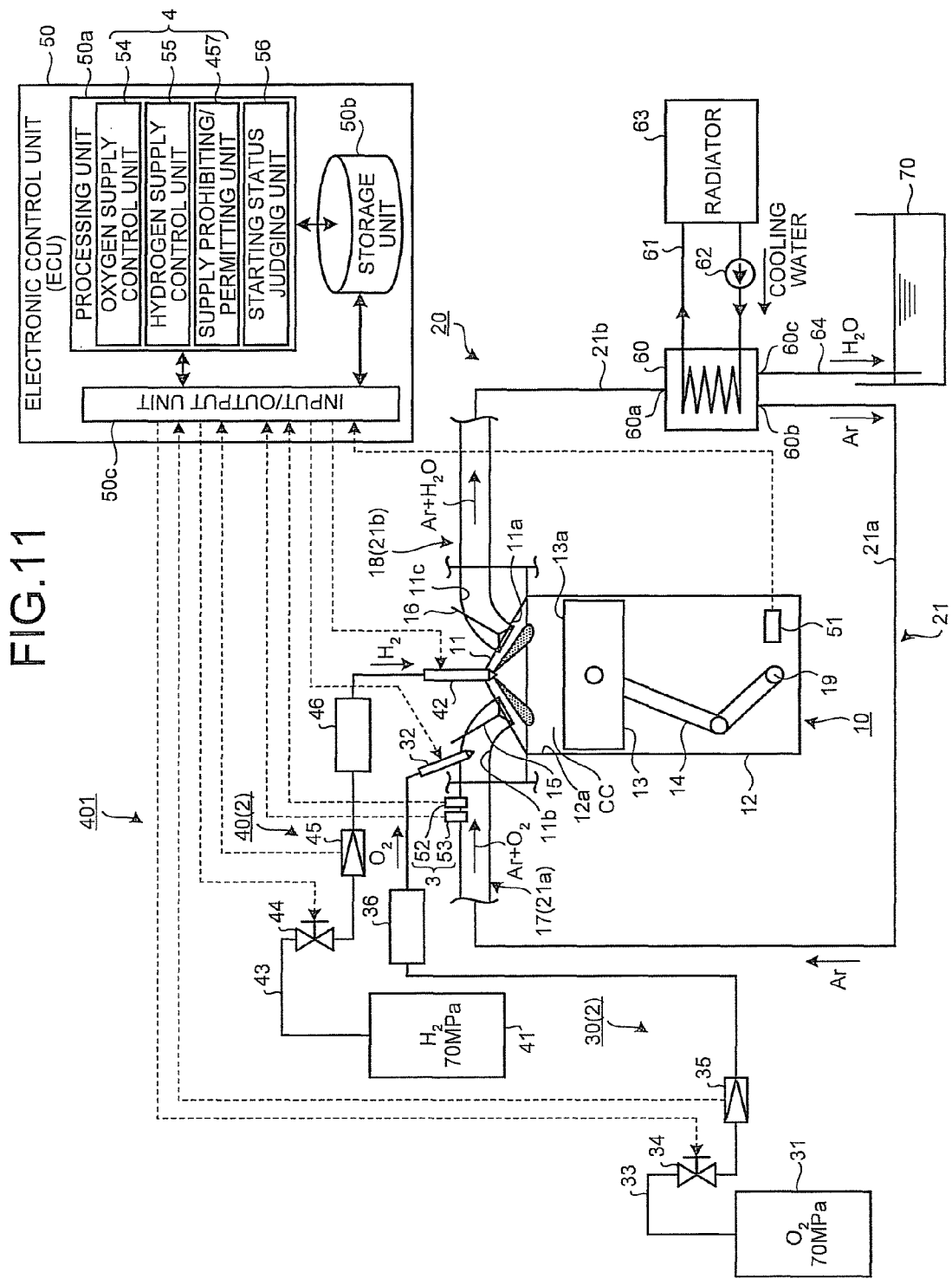
FIG. 11 is a schematic diagram of a working gas circulation engine according to a fourth embodiment of the present invention.
Figure 12:
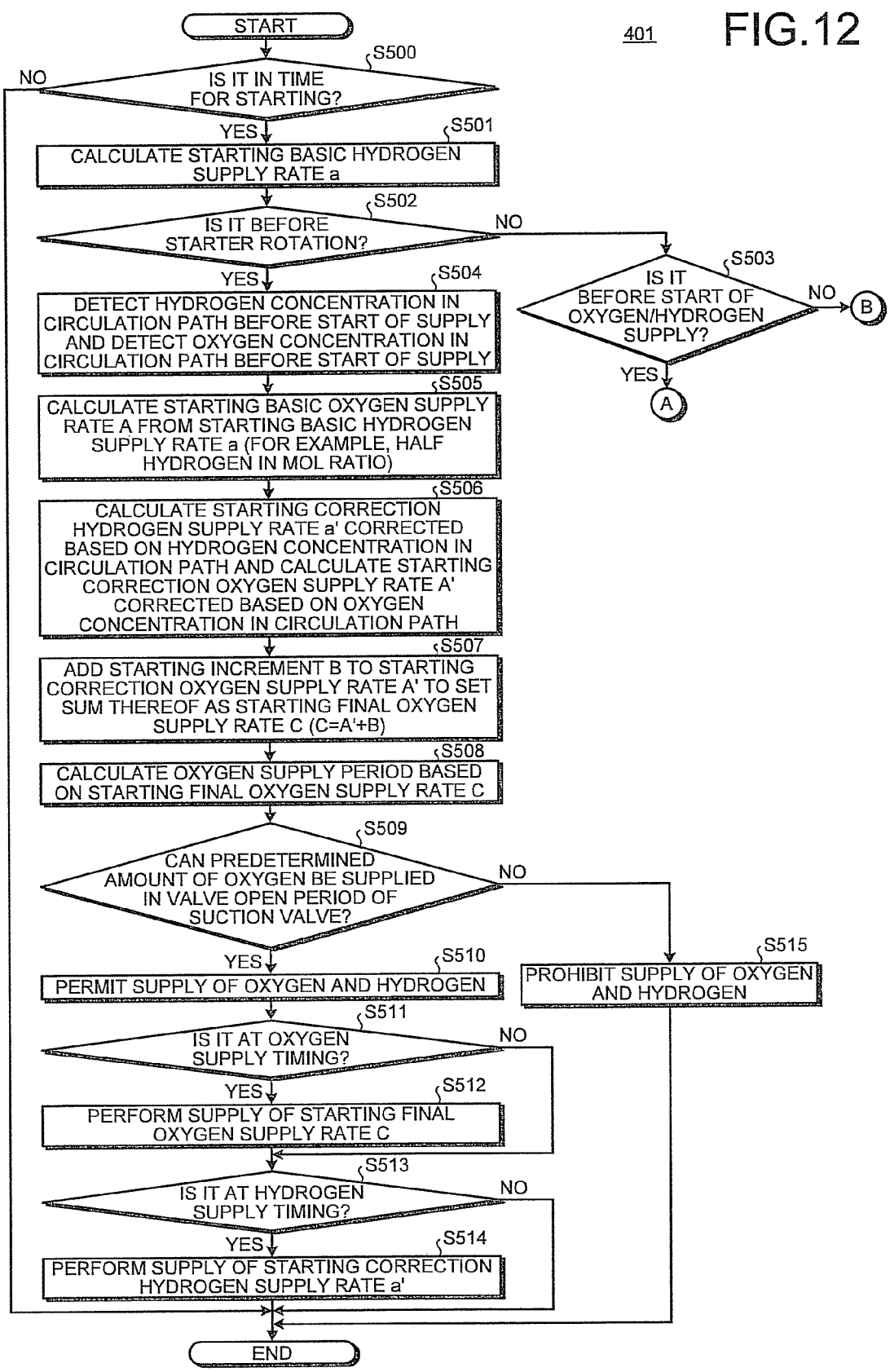
FIG. 12 is a flow chart explaining the oxygen/hydrogen supplying control when the working gas circulation engine according to the fourth embodiment of the present invention is started.

FIG. 11 is a schematic diagram of a working gas circulation engine according to a fourth embodiment of the present invention and FIG. 12 is a flow chart explaining oxygen/hydrogen supplying control when the working gas circulation engine according to the fourth embodiment of the present invention is started. The working gas circulation engine according to the fourth embodiment has substantially the same configuration as that of the working gas circulation engine according to the second embodiment, but is different therefrom in that supplying of at least hydrogen by the hydrogen supply means is limited under predetermined conditions. In addition, the same description will not be repeated if possible regarding components, operations, and effects that are common to those of the above embodiments and the same reference numerals are attached.

A working gas circulation engine 401 in the present embodiment prevents hydrogen not subjected to combustion from being accumulated in the circulation path 20 under predetermined conditions by supplying of at least hydrogen by the fuel supplying apparatus 40 being limited, here prohibited by the supply control unit 4 under the predetermined conditions.

More specifically, as illustrated in FIG. 11, the supply control unit 4 in the present embodiment function-conceptually further includes, in addition to the oxygen supply control unit 54 and the hydrogen supply control unit 55, a supply prohibiting/permitting unit 457 as supply prohibiting/permitting means in the electronic control unit (ECU) 50.

The supply prohibiting/permitting unit 457 constituting the supply control unit 4 prohibits or permits supplying of at least hydrogen by the fuel supplying apparatus 40, that is, injection of hydrogen from the fuel injection means 42 of the fuel supplying apparatus 40 under predetermined conditions. Here, the supply prohibiting/permitting unit 457 further prohibits or permits supplying of oxygen by the oxidizing agent supplying apparatus 30, that is, injection of oxygen from the oxidizing agent injection means 32 of the oxidizing agent supplying apparatus 30.

The supply prohibiting/permitting unit 457 in the present embodiment prohibits supplying of at least hydrogen by the fuel supplying apparatus 40 if the supplying period of oxygen by the oxidizing agent supplying apparatus 30 is not secured for a predetermined period in which oxygen supplied by the oxidizing agent supplying apparatus 30 is sufficiently sucked into the combustion chamber CC with respect to a valve open period of the suction valve 15 that opens/closes the suction port 11b.

The supplying period of oxygen by the oxidizing agent supplying apparatus 30 here is, for example, an injection period of oxygen by the oxidizing agent injection means 32 in one cycle in the time for starting and further, a valve open period of an oxidizing agent injection valve constituting the oxidizing agent injection means 32. That is, the supplying period of oxygen by the oxidizing agent supplying apparatus 30, in other words, the injection period of oxygen by the oxidizing agent injection means 32 is a period from a valve opening start point of an oxidizing agent injection valve constituting the oxidizing agent injection means 32 in a closed valve state to an open valve end point when the oxidizing agent injection valve is in a closed valve state again after undergoing a valve open state. The valve opening start point of the oxidizing agent injection valve constituting the oxidizing agent injection means 32 is an injection start point of oxygen by the oxidizing agent injection means 32, that is, a supplying start point of oxygen by the oxidizing agent supplying apparatus 30. The open valve end point of the oxidizing agent injection valve constituting the oxidizing agent injection means 32 is an injection end point of oxygen by the oxidizing agent injection means 32, that is, a supplying end point of oxygen by the oxidizing agent supplying apparatus 30. If it is assumed that the quantity of oxygen that can be injected by the oxidizing agent injection means 32 in a unit time is approximately constant, the supplying period of oxygen by the oxidizing agent supplying apparatus 30 becomes relatively longer with an increasing supply rate of oxygen requested in one cycle, that is, an increasing final supply rate of oxygen set by the oxygen supply control unit 54 in one cycle.

As described above, the oxidizing agent supplying apparatus 30 supplies oxygen supplies oxygen into the combustion chamber CC by oxygen being injected by the oxidizing agent injection means 32 into the suction port 11b on the opposite side of the combustion chamber CC sandwiching the suction valve 15. Thus, in the working gas circulation engine 401, the first supplying period of oxygen by the oxidizing agent supplying apparatus 30 may not be properly secured for, for example, the first open valve period of the suction valve 15 depending on the crank angle (crank position) when the working gas circulation engine 401 is stopped, in other words, the crank angle at the starting start point of the working gas circulation engine 401. Namely, for example, if the supplying start point of a supplying period to supply oxygen at the supply rate set by the oxygen supply control unit 54 from the oxidizing agent supplying apparatus 30 cannot be secured for a predetermined interval (period) with respect to the open valve start point of the suction valve 15 or the supplying end point is after an open valve end point of the suction valve 15, the supplying period of oxygen by the oxidizing agent supplying apparatus 30 may not be properly secured with respect to the open valve period of the suction valve 15, resulting in oxygen supplied into the suction port 11b by the oxidizing agent supplying apparatus 30 being insufficiently sucked into the combustion chamber CC. As a result, the working gas circulation engine 401 may start combustion of oxygen and hydrogen in the time for starting in a state in which oxygen in the combustion chamber CC is insufficient for hydrogen supplied into the combustion chamber CC, leading to accumulation of hydrogen not subjected to combustion in the circulation path 20.

Thus, the supply prohibiting/permitting unit 457 in the present embodiment prohibits, as described above, supplying of hydrogen by the fuel supplying apparatus 40 if the supplying period of oxygen by the oxidizing agent supplying apparatus 30 in the time for starting is not secured for a predetermined period in which oxygen supplied by the oxidizing agent supplying apparatus 30 is sufficiently sucked into the combustion chamber CC with respect to a valve open period of the suction valve 15. Here, the supply prohibiting/permitting unit 457 also prohibits supplying of oxygen by the oxidizing agent supplying apparatus 30 if the supplying period of oxygen by the oxidizing agent supplying apparatus 30 in the time for starting is not secured for a predetermined period in which oxygen supplied by the oxidizing agent supplying apparatus 30 is sufficiently sucked into the combustion chamber CC with respect to a valve open period of the suction valve 15. The supply prohibiting/permitting unit 457 may judge whether the supplying period of oxygen by the oxidizing agent supplying apparatus 30 in the time for starting is secured for a predetermined period in which oxygen supplied by the oxidizing agent supplying apparatus 30 is sufficiently sucked into the combustion chamber CC with respect to a valve open period of the suction valve 15 based on, for example, a detection result of the crank angle sensor 51 or the supply rate of oxygen set by the oxygen supply control unit 54.

As a result, if the supplying period of oxygen by the oxidizing agent supplying apparatus 30 in the time for starting is not secured for a predetermined period in which oxygen supplied by the oxidizing agent supplying apparatus 30 is sufficiently sucked into the combustion chamber CC with respect to a valve open period of the suction valve 15, the supply prohibiting/permitting unit 457 prohibits supplying of at least hydrogen by the fuel supplying apparatus 40 and thus, the working gas circulation engine 401 can prevent combustion of oxygen and hydrogen in the time for starting in a state in which oxygen in the combustion chamber CC is insufficient for hydrogen supplied into the combustion chamber CC from being started and reliably prevent hydrogen not subjected to combustion from being accumulated in the circulation path 20.

Next, the oxygen/hydrogen supplying control in the time for starting the working gas circulation engine 401 according to the present embodiment will be described more concretely with reference to the flow chart in FIG. 12. The oxygen/hydrogen supplying control in the time for starting is control exercised by the starting control of the working gas circulation engine 401 and is basically exercised between the starting start point t1 and the starting end point t4. A control routine thereof is repeatedly executed in a control period of several milliseconds to several tens milliseconds.

First, the starting status judging unit 56 of the electronic control unit 50 acquires the engine speed of the working gas circulation engine 401 based on a detection signal of the crank angle sensor 51 and judges whether the working gas circulation engine 401 is in the time for starting based on the acquired engine speed (S500).

If the starting status judging unit 56 judges that the working gas circulation engine 401 is not in the time for starting (S500: No), that is, the working gas circulation engine 401 is after starting, the electronic control unit 50 terminates the current control period to move to the next one and also exercises, for example, normal oxygen/hydrogen supplying control.

If the starting status judging unit 56 judges that the working gas circulation engine 401 is in the time for starting (S500: Yes), the hydrogen supply control unit 55 calculates the starting basic hydrogen supply rate a (S501).

Next, the starting status judging unit 56 judges whether the starter (not illustrated) such as a cell motor is before starting to rotate, that is, before driving of the crankshaft 19 is started and reciprocating motion inside the cylinder bore 12a of the piston 13 is started (S502).

If the starting status judging unit 56 judges that the starter (not illustrated) is before starting to rotate (S502: No), the starting status judging unit 56 judges whether the present time is before supplying of oxygen and hydrogen by the oxidizing agent supplying apparatus 30 and the fuel supplying apparatus 40 respectively (before the first supplying of oxygen and hydrogen) is started (S503).

If the starting status judging unit 56 judges that the present time is before supplying of oxygen and hydrogen by the oxidizing agent supplying apparatus 30 and the fuel supplying apparatus 40 is started (S503: Yes), the electronic control unit 50 moves to S303 (see FIG. 7) described with reference to FIG. 7 to perform subsequent processing. On the other hand, if the starting status judging unit 56 judges that the present time is after supplying of oxygen and hydrogen by the oxidizing agent supplying apparatus 30 and the fuel supplying apparatus 40 is started (S503: No), the electronic control unit 50 moves to S311 (see FIG. 7) described with reference to FIG. 7 to perform subsequent processing. The detailed description thereof will not be repeated.

If the starting status judging unit 56 judges at S502 that the starter (not illustrated) is before starting to rotate (S502: Yes), the hydrogen supply control unit 55 acquires the concentration of hydrogen detected by the hydrogen concentration sensor 53 (the concentration of hydrogen inside the circulation path 20 before the start of supplying of hydrogen by the fuel supplying apparatus 40), and the oxygen supply control unit 54 acquires the concentrations of oxygen detected by the oxygen concentration sensor 52 (the concentration of oxygen inside the circulation path 20 before the start of supplying of oxygen by the oxidizing agent supplying apparatus 30) (S504).

Next, the oxygen supply control unit 54 calculates the starting basic oxygen supply rate A based on the starting basic hydrogen supply rate a calculated at S501 (S505).

Next, the hydrogen supply control unit 55 corrects the starting basic hydrogen supply rate a calculated at S501 based on the current concentration of hydrogen inside the circulation path 20 acquired at S504 before the start of supplying of hydrogen by the fuel supplying apparatus 40 to calculate the starting correction hydrogen supply rate a', and the oxygen supply control unit 54 corrects the starting basic oxygen supply rate A calculated at S505 based on the concentration of oxygen inside the circulation path 20 acquired at S504 before the start of supplying of oxygen by the oxidizing agent supplying apparatus 30 to calculate the starting correction oxygen supply rate A' (S506).

Next, the oxygen supply control unit 54 adds the starting increment B to the starting correction oxygen supply rate A' calculated at S506 and sets the sum of the starting correction oxygen supply rate A' and the starting increment B as the starting final oxygen supply rate C (S507).

Next, the oxygen supply control unit 54 calculates an oxygen supplying period to supply oxygen of the starting final oxygen supply rate C from the oxidizing agent supplying apparatus 30, in other words, an oxygen injection period to inject oxygen of the starting final oxygen supply rate C from the oxidizing agent injection means 32 based on the starting final oxygen supply rate C set at S507 (S508).

Next, based on the detection result of the crank angle of the crank angle sensor 51, the supplying period of oxygen by the oxidizing agent supplying apparatus 30 for supplying oxygen of the starting final oxygen supply rate C calculated at S508 and the like, the supply prohibiting/permitting unit 457 judges whether a predetermined quantity (the starting final oxygen supply rate C) of oxygen can be supplied into the chamber, that is, the supplying period of oxygen by the oxidizing agent supplying apparatus 30 is secured for a predetermined period in which oxygen supplied by the oxidizing agent supplying apparatus 30 is sufficiently sucked into the combustion chamber CC with respect to a valve open period of the suction valve 15 (S509).

If the supply prohibiting/permitting unit 457 judges that a predetermined quantity of oxygen can be supplied into the combustion chamber CC in a valve open period of the suction valve 15 (S509: Yes), the supply prohibiting/permitting unit 457 permits supplying of oxygen and hydrogen by the oxidizing agent supplying apparatus 30 and the fuel supplying apparatus 40 respectively (S510).

Next, the oxygen supply control unit 54 judges whether the present time is the supplying timing of oxygen (S511).

If the oxygen supply control unit 54 judges that the present time is the supplying timing of oxygen (S511: Yes), the oxygen supply control unit 54 exercises control so that the supply rate of oxygen from the oxidizing agent supplying apparatus 30 becomes the starting final oxygen supply rate C by controlling driving of the oxidizing agent injection means 32 of the oxidizing agent supplying apparatus 30 and the injection quantity of oxygen from the oxidizing agent injection means 32 based on the starting final oxygen supply rate C set at S507 (S512). If the oxygen supply control unit 54 judges that the present time is not the supplying timing of oxygen (S511: No), the electronic control unit 50 skips this S512 to move to the next S513.

Next, the hydrogen supply control unit 55 judges whether the present time is the supplying timing of hydrogen (S513).

If the hydrogen supply control unit 55 judges that the present time is the supplying timing of hydrogen (S513: Yes), the hydrogen supply control unit 55 exercises control so that the supply rate of hydrogen from the fuel supplying apparatus 40 becomes the starting correction hydrogen supply rate a' by controlling driving of the fuel injection means 42 of the fuel supplying apparatus 40 and the injection quantity of hydrogen from the fuel injection means 42 based on the starting correction hydrogen supply rate a' calculated at S506 (S514) and the electronic control unit 50 terminates the current control period to move to the next one. If the hydrogen supply control unit 55 judges that the present time is not the supplying timing of hydrogen (S513: No), the electronic control unit 50 skips S514 to terminate the current control period before moving to the next one.

Since here the starting status judging unit 56 judges at S502 that the starter (not illustrated) is before starting to rotate (S502: Yes), the oxygen supply control unit 54 mostly judges that the present time is not the supplying timing of oxygen at S511 and the hydrogen supply control unit 55 judges that the present time is not the supplying timing of hydrogen at S513 and therefore, after supplying of oxygen and hydrogen by the oxidizing agent supplying apparatus 30 and the fuel supplying apparatus 40 respectively being permitted, the current control period terminates to move to the next one without actually oxygen and hydrogen being supplied by the oxidizing agent supplying apparatus 30 and the fuel supplying apparatus 40 respectively.

If the supply prohibiting/permitting unit 457 judges that a predetermined quantity of oxygen cannot be supplied into the combustion chamber CC in a valve open period of the suction valve 15 (S509: No), that is, the supplying period of oxygen by the oxidizing agent supplying apparatus 30 is not secured for a predetermined period in which oxygen supplied by the oxidizing agent supplying apparatus 30 is sufficiently sucked into the combustion chamber CC with respect to a valve open period of the suction valve 15, the supply prohibiting/permitting unit 457 prohibits supplying of oxygen and hydrogen by the oxidizing agent supplying apparatus 30 and the fuel supplying apparatus 40 respectively (S515) and terminates the current control period before moving to the next one.

According to the working gas circulation engine 401 in the above embodiment of the present invention, the working gas circulation engine 401 can supply reactants (oxygen, hydrogen) into the combustion chamber CC in proper quantities with respect to the supply rates of the reactants normally needed for starting regardless of the residual state of reactants inside the circulation path 20 after the last stop of the working gas circulation engine 401 by at least the initial supply rates of reactants by the supplying apparatus 2 being controlled by the supply control unit 4 in the time T1 for starting based on the concentrations of reactants detected by the reactant concentration sensor 3 before the start of supplying of the reactants by the supplying apparatus 2 and adjust the ratio of the reactants to a working gas inside the combustion chamber CC to a proper ratio capable of providing proper starting torque required for starting in the time for starting so that proper starting can be assured.

Further, according to the working gas circulation engine 401 in the above embodiment of the present invention, the supplying apparatus 2 includes the oxidizing agent supplying apparatus 30 that supplies oxygen as a reactant to the circulation path 20 to supply the oxygen into the combustion chamber CC and the fuel supplying apparatus 40 that supplies hydrogen as a reactant subjected to combustion by oxygen directly into the combustion chamber CC and the supply prohibiting/permitting unit 457 constituting the supply control unit 4 limits, here prohibits supplying of at least hydrogen by the fuel supplying apparatus 40 if the supplying period of oxygen by the oxidizing agent supplying apparatus 30 in the time for starting is not secured for a predetermined period in which oxygen supplied by the oxidizing agent supplying apparatus 30 is sufficiently sucked into the combustion chamber CC with respect to a valve open period of the suction valve 15 that opens/closes the suction port 11b constituting the circulation path 20. Therefore, if the supplying period of oxygen by the oxidizing agent supplying apparatus 30 in the time for starting is not secured for a predetermined period in which oxygen supplied by the oxidizing agent supplying apparatus 30 is sufficiently sucked into the combustion chamber CC with respect to a valve open period of the suction valve 15, the working gas circulation engine 401 can prevent combustion of oxygen and hydrogen in the time for starting in a state in which oxygen in the combustion chamber CC is insufficient for hydrogen supplied into the combustion chamber CC from being started and reliably prevent hydrogen not subjected to combustion from being accumulated in the circulation path 20 by supplying of at least hydrogen by the fuel supplying apparatus 40 being prohibited by the supply prohibiting/permitting unit 457.

(Fifth Embodiment)

Figure 13:
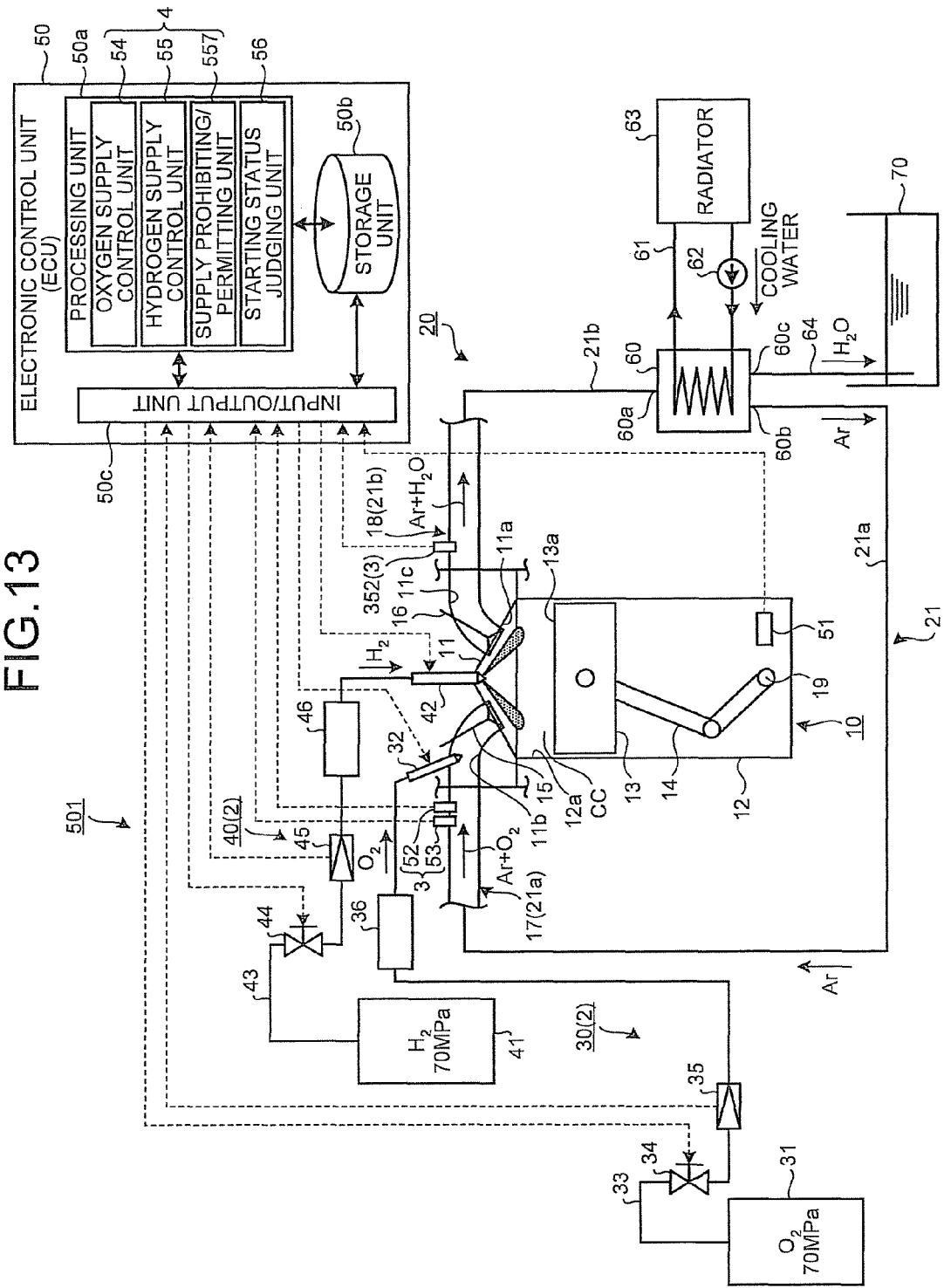
FIG. 13 is a schematic diagram of a working gas circulation engine according to a fifth embodiment of the present invention.
Figure 14:
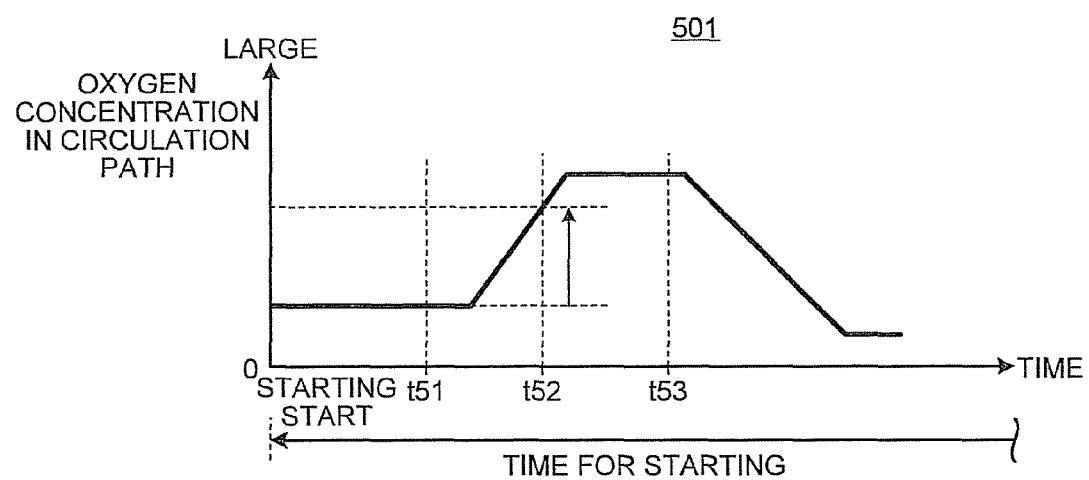
FIG. 14 is a time chart explaining one example of the oxygen/hydrogen supplying control when the working gas circulation engine according to the fifth embodiment of the present invention is started.
Figure 15:
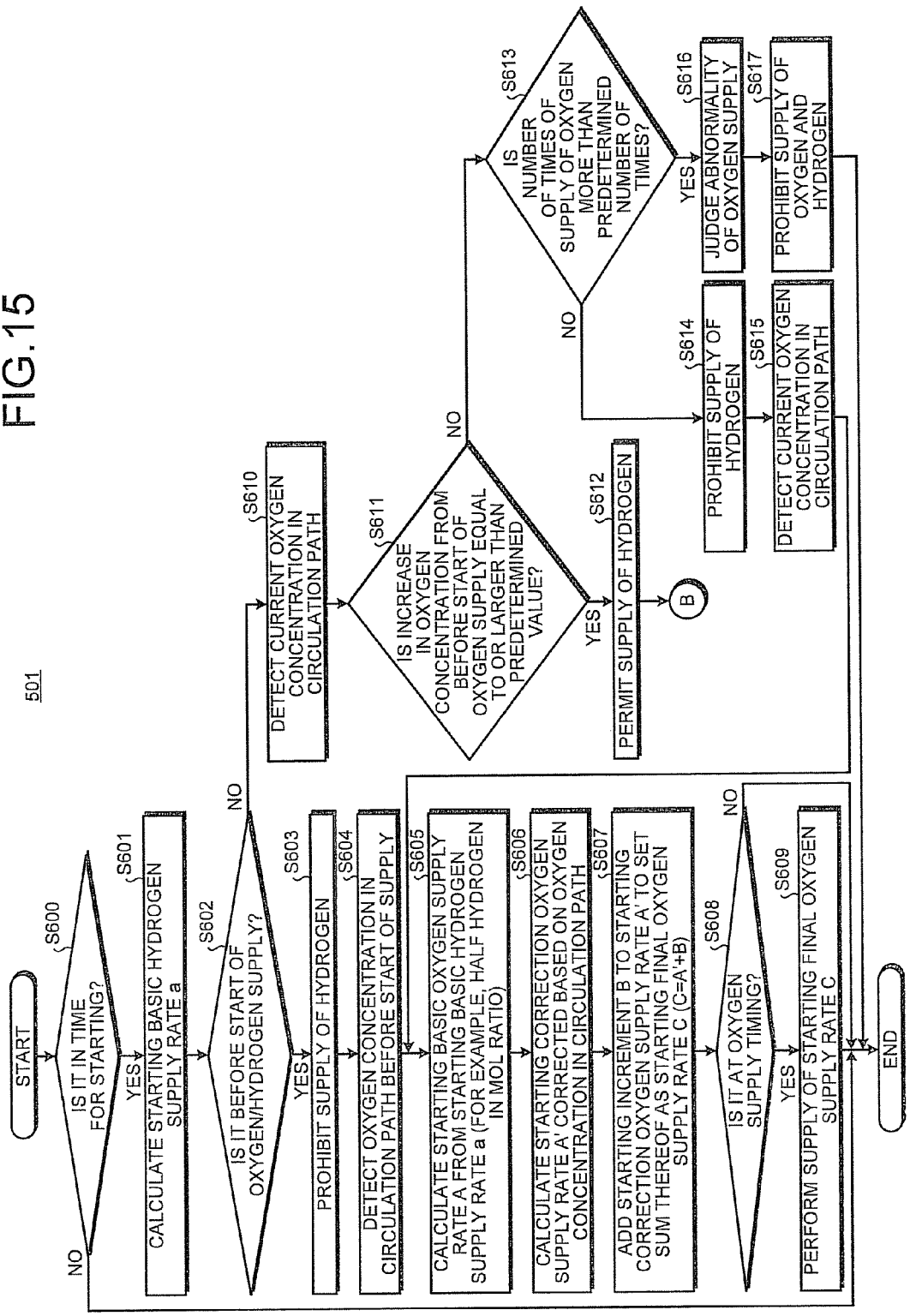
FIG. 15 is a flow chart explaining the oxygen/hydrogen supplying control when the working gas circulation engine according to the fifth embodiment of the present invention is started.

FIG. 13 is a schematic diagram of a working gas circulation engine according to a fifth embodiment of the present invention, FIG. 14 is a time chart exemplifying oxygen/hydrogen supplying control when the working gas circulation engine according to the fifth embodiment of the present invention is started, and FIG. 15 is a flow chart explaining the oxygen/hydrogen supplying control when the working gas circulation engine according to the fifth embodiment of the present invention is started. The working gas circulation engine according to the fifth embodiment has substantially the same configuration as that of the working gas circulation engine according to the second embodiment, but is different therefrom in that supplying of hydrogen by the hydrogen supply means is permitted under predetermined conditions. In addition, the same description will not be repeated if possible regarding components, operations, and effects that are common to those of the above embodiments and the same reference numerals are attached.

A working gas circulation engine 501 in the present embodiment prevents hydrogen not subjected to combustion from being accumulated in the circulation path 20 by supplying of hydrogen by the fuel supplying apparatus 40 being permitted by the supply control unit 4 under predetermined conditions.

More specifically, as illustrated in FIG. 13, the supply control unit 4 in the present embodiment function-conceptually further includes, in addition to the oxygen supply control unit 54 and the hydrogen supply control unit 55, a supply prohibiting/permitting unit 557 as supply prohibiting/permitting means in the electronic control unit (ECU) 50.

The supply prohibiting/permitting unit 557 constituting the supply control unit 4 prohibits or permits supplying of at least hydrogen by the fuel supplying apparatus 40, that is, injection of hydrogen from the fuel injection means 42 of the fuel supplying apparatus 40 under predetermined conditions. Here, the supply prohibiting/permitting unit 557 further prohibits or permits supplying of oxygen by the oxidizing agent supplying apparatus 30, that is, injection of oxygen from the oxidizing agent injection means 32 of the oxidizing agent supplying apparatus 30.

The working gas circulation engine 501 in the present embodiment includes, like the working gas circulation engine 301 (see FIG. 8) described above, the oxygen concentration sensor 352 separately from the oxygen concentration sensor 52 as the reactant concentration sensor 3. The oxygen concentration sensor 352 is provided near the exhaust port 11c to detect the concentration of oxygen in an exhaust gas immediately after being discharged from the combustion chamber CC to the exhaust port 11c. If, for example, like the working gas circulation engine 301 (see FIG. 8), the suction port 11b and the exhaust port 11c connected via the circulating passage 21 are close to each other, as illustrated in FIG. 1, the working gas circulation engine 501 according to the present embodiment may also use the oxygen concentration sensor 52 in place of the oxygen concentration sensor 352 or the oxygen concentration sensor 352 in place of the oxygen concentration sensor 52.

The supply prohibiting/permitting unit 557 in the present embodiment supplies oxygen by the oxidizing agent supplying apparatus 30 in the time for starting and permits supplying of hydrogen by the fuel supplying apparatus 40 when the oxygen concentration sensor 352 constituting the reactant concentration sensor 3 detects a predetermined amount of change in concentration of oxygen.

For example, in the time chart exemplified in FIG. 14, the oxygen supply control unit 54 constituting the supply control unit 4 supplies oxygen from the oxidizing agent supplying apparatus 30 at a point t51 in the time for starting. If oxygen is normally supplied from the oxidizing agent supplying apparatus 30, oxygen supplied from the oxidizing agent supplying apparatus 30 is discharged to the exhaust port 11c via the suction port 11b and the combustion chamber CC before reaching a concentration detection position of the oxygen concentration sensor 352. If oxygen is normally supplied from the oxidizing agent supplying apparatus 30, the concentration of oxygen detected by the oxygen concentration sensor 352 increases by a predetermined amount when compared with the concentration of oxygen before the start of supplying of oxygen in accordance with the supply rate of oxygen from the oxidizing agent supplying apparatus 30. On the other hand, if oxygen is not normally supplied from the oxidizing agent supplying apparatus 30, the concentration of oxygen detected by the oxygen concentration sensor 352 is approximately the same as the concentration of oxygen before the start of supplying of oxygen or an increase compared with the concentration of oxygen before the start of supplying of oxygen decreases. Then, if, for example, at a point t52, the concentration of oxygen detected by the oxygen concentration sensor 352 increases by a predetermined amount when compared with the concentration of oxygen before the start of supplying of oxygen by the oxidizing agent supplying apparatus 30, that is, after normal supplying of oxygen from the oxidizing agent supplying apparatus 30 is confirmed, at a point t53, the supply prohibiting/permitting unit 557 permits supplying of hydrogen by the fuel supplying apparatus 40 in the next and subsequent cycles. On the other hand, if the concentration of oxygen detected by the oxygen concentration sensor 352 does not increase by a predetermined amount when compared with the concentration of oxygen before the start of supplying of oxygen by the oxidizing agent supplying apparatus 30, that is, normal supplying of oxygen from the oxidizing agent supplying apparatus 30 cannot be confirmed, the supply prohibiting/permitting unit 557 prohibits supplying of hydrogen by the fuel supplying apparatus 40.

As a result, the supply prohibiting/permitting unit 557 constituting the supply control unit 4 supplies oxygen by the oxidizing agent supplying apparatus 30 in the time for starting and, if the oxygen concentration sensor 352 constituting the reactant concentration sensor 3 detects a predetermined amount of change in concentration of oxygen, permits supplying of hydrogen by the fuel supplying apparatus 40 and therefore, the working gas circulation engine 501 can prevent combustion of oxygen and hydrogen in the time for starting in a state in which oxygen in the combustion chamber CC is insufficient for hydrogen supplied into the combustion chamber CC from being started and reliably prevent hydrogen not subjected to combustion from being accumulated in the circulation path 20 even if the oxidizing agent supplying apparatus 30 malfunctions, for example, oxygen in the oxidizing agent storage tank 31 runs out or the oxidizing agent injection means 32 fails.

Next, the oxygen/hydrogen supplying control in the time for starting the working gas circulation engine 501 according to the present embodiment will be described more concretely with reference to the flow chart in FIG. 15. The oxygen/hydrogen supplying control in the time for starting is control exercised by the starting control of the working gas circulation engine 501 and is basically exercised between the starting start point t1 and the starting end point t4. A control routine thereof is repeatedly executed in a control period of several milliseconds to several tens milliseconds.

First, the starting status judging unit 56 of the electronic control unit 50 acquires the engine speed of the working gas circulation engine 501 based on a detection signal of the crank angle sensor 51 and judges whether the working gas circulation engine 501 is in the time for starting based on the acquired engine speed (S600).

If the starting status judging unit 56 judges that the working gas circulation engine 501 is not in the time for starting (S600: No), that is, the working gas circulation engine 501 is after starting, the electronic control unit 50 terminates the current control period to move to the next one and also exercises, for example, normal oxygen/hydrogen supplying control.

If the starting status judging unit 56 judges that the working gas circulation engine 501 is in the time for starting (S600: Yes), the hydrogen supply control unit 55 calculates the starting basic hydrogen supply rate a (S601).

The starting status judging unit 56 judges whether the present time is before supplying of oxygen and hydrogen by the oxidizing agent supplying apparatus 30 and the fuel supplying apparatus 40 respectively (before the first supplying of oxygen and hydrogen) is started (S602).

If the starting status judging unit 56 judges that the present time is before supplying of oxygen and hydrogen by the oxidizing agent supplying apparatus 30 and the fuel supplying apparatus 40 is started (S602: Yes), the supply prohibiting/permitting unit 557 constituting the supply control unit 4 temporarily prohibits supplying of hydrogen by the fuel supplying apparatus 40 (S603).

Next, the oxygen supply control unit 54 acquires the concentration of oxygen detected by each of the oxygen concentration sensor 52 and the oxygen concentration sensor 352 (the concentration of oxygen inside the circulation path 20 before the start of supplying of oxygen by the oxidizing agent supplying apparatus 30) (S604).

Next, the oxygen supply control unit 54 calculates the starting basic oxygen supply rate A based on the starting basic hydrogen supply rate a calculated at S601 (S605).

Next, the oxygen supply control unit 54 corrects the starting basic oxygen supply rate A calculated at S605 based on the concentration of oxygen inside the circulation path 20 acquired at S604 before the start of supplying of oxygen by the oxidizing agent supplying apparatus 30, here the concentration of oxygen detected by the oxygen concentration sensor 52 to calculate the starting correction oxygen supply rate A' (S606).

Next, the oxygen supply control unit 54 adds the starting increment B to the starting correction oxygen supply rate A' calculated at S606 and sets the sum of the starting correction oxygen supply rate A' and the starting increment B as the starting final oxygen supply rate C (S607).

Next, the oxygen supply control unit 54 judges whether the present time is the supplying timing of oxygen (S608).

If the oxygen supply control unit 54 judges that the present time is the supplying timing of oxygen (S608: Yes), the oxygen supply control unit 54 exercises control so that the supply rate of oxygen from the oxidizing agent supplying apparatus 30 becomes the starting final oxygen supply rate C by controlling driving of the oxidizing agent injection means 32 of the oxidizing agent supplying apparatus 30 and the injection quantity of oxygen from the oxidizing agent injection means 32 based on the starting final oxygen supply rate C set at S607 (S609) and terminates the current control period before moving to the next one. If the oxygen supply control unit 54 judges that the present time is not the supplying timing of oxygen (S608: No), the electronic control unit 50 skips this S609 to terminate the current control period before moving to the next one.

If the starting status judging unit 56 judges at S602 that the present time is after supplying of oxygen and hydrogen by the oxidizing agent supplying apparatus 30 and the fuel supplying apparatus 40 is started (S602: No), the supply prohibiting/permitting unit 557 acquires the concentration of oxygen detected by the oxygen concentration sensor 352 (the current concentration of oxygen inside the circulation path 20 after the start of supplying of oxygen by the oxidizing agent supplying apparatus 30) (S610).

Next, the supply prohibiting/permitting unit 557 compares the concentration of oxygen inside the circulation path 20 acquired at S604 in a control period before the current control period before the start of supplying of oxygen by the oxidizing agent supplying apparatus 30, here the concentration of oxygen detected by the oxygen concentration sensor 352 and the current concentration of oxygen inside the circulation path 20 acquired at S610 after the start of supplying of oxygen by the oxidizing agent supplying apparatus 30 to judge whether an increase in the current concentration of oxygen after the start of supplying of oxygen from the concentration of oxygen before the start of supplying of oxygen is equal to or greater than a predetermined value set in advance (S611).

If the supply prohibiting/permitting unit 557 judges that an increase in the current concentration of oxygen after the start of supplying of oxygen from the concentration of oxygen before the start of supplying of oxygen is equal to or greater than a predetermined value set in advance (S611: Yes), the supply prohibiting/permitting unit 557 permits supplying of hydrogen by the fuel supplying apparatus 40 (S612) and the electronic control unit 50 moves to S311 (see FIG. 7) described with reference to FIG. 7 to perform processing below. The detailed description thereof will not be repeated.

If the supply prohibiting/permitting unit 557 judges that an increase in the current concentration of oxygen after the start of supplying of oxygen from the concentration of oxygen before the start of supplying of oxygen is smaller than a predetermined value set in advance (S611: No), the supply prohibiting/permitting unit 557 judges whether oxygen has been supplied by the oxidizing agent supplying apparatus 30 a predetermined number of times set in advance or more (S613). That is, the supply prohibiting/permitting unit 557 judges whether oxygen has been supplied a predetermined number of times set in advance, starting with the first supplying of oxygen by the oxidizing agent supplying apparatus 30 in the time T1 for starting.

If the supply prohibiting/permitting unit 557 judges that oxygen has not been supplied by the oxidizing agent supplying apparatus 30 a predetermined number of times set in advance or more (S613: No), the supply prohibiting/permitting unit 557 continues to prohibit supplying of hydrogen by the fuel supplying apparatus 40 (S614).

Next, the oxygen supply control unit 54 acquires the concentration of oxygen detected by each of the oxygen concentration sensor 52 and the oxygen concentration sensor 352 (the current concentration of oxygen inside the circulation path 20 after the start of supplying of oxygen by the oxidizing agent supplying apparatus 30) (S615) and the electronic control unit 50 moves to S605 to perform processing below. In this case, at S606, the oxygen supply control unit 54 corrects the starting basic oxygen supply rate A calculated at S605 based on the current concentration of oxygen inside the circulation path 20 acquired at S615 after the start of supplying of oxygen by the oxidizing agent supplying apparatus 30 to calculate the starting correction oxygen supply rate A'.

If the supply prohibiting/permitting unit 557 judges at S613 that oxygen has been supplied by the oxidizing agent supplying apparatus 30 a predetermined number of times set in advance or more (S613: Yes), the supply prohibiting/permitting unit 557 judges that supplying of oxygen by the oxidizing agent supplying apparatus 30 is abnormal (S616) and, for example, reports abnormality of supplying of oxygen by the oxidizing agent supplying apparatus 30 via alarming means (not illustrated) and prohibits supplying of oxygen and hydrogen by the oxidizing agent supplying apparatus 30 and the fuel supplying apparatus 40 respectively (S617) before terminating the control.

According to the working gas circulation engine 501 in the above embodiment of the present invention, the working gas circulation engine 501 can supply reactants (oxygen, hydrogen) into the combustion chamber CC in proper quantities with respect to the supply rates of the reactants normally needed for starting regardless of the residual state of reactants inside the circulation path 20 after the last stop of the working gas circulation engine 501 by at least the initial supply rates of reactants by the supplying apparatus 2 being controlled by the supply control unit 4 in the time T1 for starting based on the concentrations of reactants detected by the reactant concentration sensor 3 before the start of supplying of the reactants by the supplying apparatus 2 and adjust the ratio of the reactants to a working gas inside the combustion chamber CC to a proper ratio capable of providing proper starting torque required for starting in the time for starting so that proper starting can be assured.

Further, according to the working gas circulation engine 501 in the above embodiment of the present invention, the supplying apparatus 2 includes the oxidizing agent supplying apparatus 30 that supplies oxygen as a reactant and the fuel supplying apparatus 40 that supplies hydrogen as a reactant subjected to combustion by oxygen and the supply prohibiting/permitting unit 557 constituting the supply control unit 4 supplies oxygen by the oxidizing agent supplying apparatus 30 in the time for starting and, if the oxygen concentration sensor 352 constituting the reactant concentration sensor 3 detects a predetermined amount of change in concentration of oxygen, permits supplying of hydrogen by the fuel supplying apparatus 40. Therefore, if the supply prohibiting/permitting unit 557 constituting the supply control unit 4 supplies oxygen by the oxidizing agent supplying apparatus 30 in the time for starting and the oxygen concentration sensor 352 constituting the reactant concentration sensor 3 detects a predetermined amount of change in concentration of oxygen, the working gas circulation engine 501 can prevent combustion of oxygen and hydrogen in the time for starting in a state in which oxygen in the combustion chamber CC is insufficient for hydrogen supplied into the combustion chamber CC from being started and reliably prevent hydrogen not subjected to combustion from being accumulated in the circulation path 20 by permitting supplying of hydrogen by the by the fuel supplying apparatus 40 even if, for example, the oxidizing agent supplying apparatus 30 malfunctions.

Working gas circulation engines in the above embodiments of the present invention are not limited to the above embodiments and various modifications can be made within the scope of claims. A working gas circulation engine according to an embodiment of the present invention may be constructed by combining a plurality of embodiments described above.

In the above description, working gas circulation engines are assumed to have the fuel injection means 42 provided in such a way that fuel is directly injected into the combustion chamber CC, but the fuel injection means 42 may be mounted on the cylinder head 11 to inject fuel into the suction port 11b. Also in this case, working gas circulation engines of the present invention can start properly.

In the above description, working gas circulation engines are assumed to have the oxidizing agent injection means 32 provided in such a way that oxygen is injected into the suction port 11b, but the oxidizing agent injection means 32 may be mounted on the cylinder head 11 to directly inject oxygen into the combustion chamber CC. Also in this case, working gas circulation engines of the present invention can start properly.

In the above description, working gas circulation engines are assumed to subject hydrogen ($H_2$) as fuel to diffusion combustion, but a form of so-called spark ignition combustion in which fuel is ignited by a spark plug (not illustrated) may also be adopted or a form of diffusion combustion in which ignition is assisted by igniting fuel by a spark plug. Namely, working gas circulation engines of the present invention described above may be applied to working gas circulation engines of different combustion forms and also in such cases, working gas circulation engines of the present invention can start properly.

Industrial Applicability

Working gas circulation engines according to the present invention can start properly, as described above, and can suitably be applied to various working gas circulation engines capable of re-supplying a working gas contained in an exhaust gas into the combustion chamber by causing the working gas to circulate from the exhaust side to the suction side of the combustion chamber.

The invention claimed is:

1. A working gas circulation engine, comprising:
a combustion chamber into which a reactant and a working gas whose specific heat ratio is higher than that of air are supplied and in which the working gas can expand due to a reaction of the reactant;
a circulation path that allows the working gas to circulate from an exhaust side to a suction side of the combustion chamber and that is capable of supplying the working gas again to the combustion chamber;
a supplying unit that supplies the reactant;
a concentration detection unit capable of detecting a concentration of the reactant in the circulation path; and
a supply control unit that sets at least a first supply rate of the reactant by the supplying unit in a time for starting, based on the concentration of the reactant detected by the concentration detection unit before a start of supplying of the reactant by the supplying unit.

2. The working gas circulation engine according to claim 1, wherein
the supplying unit supplies oxygen as the reactant,
the concentration detection unit can detect the concentration of the oxygen, and
the supply control unit sets at least the first supply rate of the oxygen by the supplying unit in the time for starting, based on the concentration of the oxygen detected by the concentration detection unit before the start of supplying of the oxygen by the supplying unit.

3. The working gas circulation engine according to claim 1, wherein
the supplying unit supplies hydrogen as the reactant,
the concentration detection unit can detect the concentration of the hydrogen, and
the supply control unit sets at least the first supply rate of the hydrogen by the supplying unit in the time for starting, based on the concentration of the hydrogen detected by the concentration detection unit before the start of supplying of the hydrogen by the supplying unit.

4. The working gas circulation engine according to claim 1, wherein, when there are a plurality of the reactants, the supply control unit sets at least the first supply rate of each of the reactants by the supplying unit in the time for starting, based on the concentration of each of the reactants detected by the concentration detection unit before the start of supplying of each of the reactants by the supplying unit.

5. The working gas circulation engine according to claim 1, wherein
the supplying unit includes an oxygen supplying unit that supplies oxygen as the reactant to the circulation path to supply the oxygen into the combustion chamber and a hydrogen supplying unit that supplies hydrogen as the reactant subjected to combustion by the oxygen directly into the combustion chamber, and
the supply control unit sets the supply rate of the oxygen by the oxygen supplying unit in an early period of the time for starting to a supply rate at which the oxygen remains in a gas after the combustion, based on the concentration of the oxygen detected by the concentration detection unit before the start of supplying of the oxygen by the oxygen supplying unit.

6. The working gas circulation engine according to claim 1, wherein
the supplying unit can includes an oxygen supplying unit that supplies oxygen as the reactant and a hydrogen supplying unit that supplies hydrogen as the reactant subjected to combustion by the oxygen, and
the supply control unit sets the supply rate of the oxygen by the oxygen supplying unit after the start of supplying of the oxygen in the time for starting, based on the concentration of the oxygen in a gas after the combustion detected by the concentration detection unit after the start of supplying of the oxygen.

7. The working gas circulation engine according to claim 1, wherein
the supplying unit includes an oxygen supplying unit that supplies oxygen as the reactant to the circulation path to supply the oxygen into the combustion chamber and a hydrogen supplying unit that supplies hydrogen as the reactant subjected to combustion by the oxygen directly into the combustion chamber, and
the supply control unit limits supplying of at least the hydrogen by the hydrogen supplying unit, when a supplying period of the oxygen by the oxygen supplying unit in the time for starting is not secured for a predetermined period in which the oxygen supplied by the oxygen supplying unit is sufficiently sucked into the combustion chamber, with respect to a valve open period of a suction valve that opens/closes a suction port constituting the circulation path.

8. The working gas circulation engine according to claim 1, wherein the supplying unit includes an oxygen supplying unit that supplies oxygen as the reactant and a hydrogen supplying unit that supplies hydrogen as the reactant subjected to combustion by the oxygen, and the supply control unit permits supplying of the hydrogen by the hydrogen supplying unit, when the concentration detection unit detects a predetermined amount of change in the concentration of the oxygen after the oxygen being supplied by the oxygen supplying unit in the time for starting.

\* \* \* \* \*